US009826710B1

(12) United States Patent
McNew

(10) Patent No.: US 9,826,710 B1
(45) Date of Patent: Nov. 28, 2017

(54) MOBILE CONFIGURABLE ANIMAL TRAP SYSTEM

(71) Applicant: Jeffrey Wayne McNew, Greenbrier, AR (US)

(72) Inventor: Jeffrey Wayne McNew, Greenbrier, AR (US)

( * ) Notice: Subject to any disclaimer, the term of this patent is extended or adjusted under 35 U.S.C. 154(b) by 157 days.

(21) Appl. No.: 14/613,776

(22) Filed: Feb. 4, 2015

Related U.S. Application Data

(60) Provisional application No. 61/936,090, filed on Feb. 5, 2014.

(51) Int. Cl.
| | |
|---|---|
| *A01K 3/00* | (2006.01) |
| *A01K 1/00* | (2006.01) |
| *E06B 11/02* | (2006.01) |
| *E04H 17/00* | (2006.01) |
| *E05F 15/77* | (2015.01) |

(52) U.S. Cl.
CPC .......... *A01K 1/0035* (2013.01); *A01K 1/0017* (2013.01); *A01K 1/0023* (2013.01); *A01K 1/0088* (2013.01); *A01K 1/0094* (2013.01); *E04H 17/003* (2013.01); *E05F 15/77* (2015.01); *E06B 11/02* (2013.01)

(58) Field of Classification Search
CPC ........ A01K 3/00; A01K 3/005; A01K 1/0017; A01K 1/0035; A01K 1/005; A01K 1/0041; A01K 1/0088; A01K 1/0094; A01K 1/0023; A01K 1/0029; A01M 23/20; A01M 31/002; E04H 17/163; E04H 17/165; E04H 17/166; E04H 17/18; E04H 17/22; E01F 13/048; E06B 11/00; E06B 11/02; E06B 11/021; E06B 11/022; E06B 11/023; E06B 11/025
USPC ....... 119/503, 504, 506, 512, 513, 514, 515, 119/519, 522, 523, 524; 43/61, 60, 58, 43/59, 65; 256/11, 21, 25, 26, 27, 73
See application file for complete search history.

(56) References Cited

U.S. PATENT DOCUMENTS

| | | | |
|---|---|---|---|
| 2,478,605 | A | 8/1949 | Symens |
| 2,800,103 | A * | 7/1957 | Bleeker ................ A01K 1/0017 119/503 |
| 3,204,606 | A | 9/1965 | Parr |
| 3,469,822 | A * | 9/1969 | O'Brien .................. E04H 17/18 256/25 |

(Continued)

*Primary Examiner* — Trinh Nguyen
(74) *Attorney, Agent, or Firm* — Stephen D. Carver

(57) ABSTRACT

A portable, trapping system for capturing and non-lethally retaining a large number of large animals, such as wild horses or feral hogs. A specialized trailer aligns and secures deployable corral components for transportation. The corral comprises a modular fence erected on-site from multiple fence panels that are hinged together by pinning. The fence panels are configured with voids to prevent animal climbing. A gate with a remotely actuated trap door is similarly pinned between adjacent fence panels. The gate threshold is concealable. Stakes secure panels to the ground, forming a stable enclosure. The trailer comprises a rigid confining frame structure adapted to constrain and transport corral components. When the corral is disassembled, multiple individual fence panels are slidably captivated between spaced apart upper and lower ceiling and floor channels, being maintained in a parallel and stable configuration. Separate upper and lower aligned channels constrain the gate assembly during transportation.

4 Claims, 29 Drawing Sheets

(56) References Cited

U.S. PATENT DOCUMENTS

| | | | |
|---|---|---|---|
| 3,545,407 A * | 12/1970 | Moore | A01K 3/00 119/502 |
| 3,741,529 A | 6/1973 | Blagg | |
| 3,767,167 A | 10/1973 | Rasmassen | |
| 3,921,585 A * | 11/1975 | Hall | B60P 3/04 119/512 |
| 3,970,045 A * | 7/1976 | Graham, Jr. | A01K 3/00 119/514 |
| 4,371,148 A | 2/1983 | Harden | |
| 4,537,151 A | 8/1985 | Bolton | |
| 4,836,143 A * | 6/1989 | Shadbolt, Jr. | A01K 3/00 119/514 |
| 4,844,424 A | 7/1989 | Knudslien | |
| 4,960,074 A * | 10/1990 | Wilson | A01K 3/00 119/512 |
| 5,199,210 A | 4/1993 | Nastas | |
| 5,280,944 A | 1/1994 | Bearden | |
| 5,864,982 A | 2/1999 | Tully | |
| 6,772,555 B2 | 8/2004 | Evans | |
| D552,751 S | 10/2007 | Van Buskirk | |
| 7,854,088 B2 | 12/2010 | Kurachi | |
| 8,061,076 B2 | 11/2011 | Kelley | |
| 8,359,783 B1 | 1/2013 | Kamery | |
| 2004/0188667 A1* | 9/2004 | Ray | A01K 3/00 256/67 |
| 2009/0000564 A1* | 1/2009 | Meyer, Jr. | A01K 1/0017 119/514 |
| 2011/0167709 A1* | 7/2011 | Pinkston | A01M 23/20 43/61 |
| 2015/0075442 A1* | 3/2015 | Wilson | A01K 3/00 119/512 |
| 2015/0250136 A1* | 9/2015 | Wilson | A01K 3/00 119/452 |

\* cited by examiner

MOBILE CONFIGURABLE ANIMAL TRAP SYSTEM

CROSS-REFERENCE TO RELATED APPLICATION

This utility application is based upon, and claims priority from, U.S. Provisional Application Ser. No. 61/936,090, filed Feb. 5, 2014, entitled "Modular, Trailerized Animal Trap System," by inventor Jeffrey W. McNew, the entire disclosure of which is hereby incorporated by reference.

BACKGROUND OF THE INVENTION

I. Field of the Invention

The present invention relates generally to portable traps for capturing relatively large animals. More particularly, the present invention relates to trailer or vehicle-mounted, transportable trap systems including modular components such as deployable corrals comprising configurable fences and gates for capturing and temporarily restraining significant quantities of relativity large animals such as feral hogs, wild horses, or the like.

II. Description of the Prior Art

So-called "Feral hogs", while not native to the United States, present an increasingly dangerous problem. They are an invasive species, a public nuisance and a threat to Arkansas and other states. They compete for food resources, destroy habitat by rooting and wallowing, and they will eat ground-nesting birds, eggs, fawns and young domestic livestock. They also carry up to forty-five bacteria, diseases and parasites, including Trichinellosis, Brucellosis and swine herpes virus.

The population of wild hogs in southern portions of the United States has increased significantly in recent years. Feral pigs have been harvested by hunting and shooting for the last few decades. Sport hunting of feral hogs has been more hindrance to hog removal than benefit. Hunting has been shown to reduce hog populations by only eight to fifty percent. The illegal relocation of hogs for hunting purposes has spread the problem to new areas. The shooting of individual hogs also thwarts large-scale trapping efforts by agencies because increased disturbance makes it nearly impossible to catch the whole family group at once.

Hogs can be chased away from crops or food plots temporarily, but they soon return and quickly become a problem for landowners. Studies show that approximately two-thirds of a hog population must be removed each year just to prevent the population from growing. Wild hogs weighing in excess of five hundred pounds are commonly found in widespread areas of Texas, Louisiana and southern Arkansas. Reports of wild hogs weighing in excess of 1000 pounds within the southern United States are not infrequent.

Feral hogs are large, strong and aggressive, and they are equipped with large tusks that can seriously injure a human being, particularly young children. Feral hogs often damage the local environment, and interfere with agriculture. Hogs require plentiful food, and their voracious appetite insures substantial competition with other wild animals, such as deer, or with domestic animals, such as cattle and horses, that are more desirable. Widespread areas of land, including recreational areas such as parks, hiking trails, and leased hunting grounds, commonly evidence the activities of large hog populations. In such areas the ground may be rooted up and visibly disturbed for hundreds of yards in every direction.

Thus feral hogs, and certain other non-game animals, have become dangerous nuisances. The Arkansas Game and Fish Commission recognizes large-scale trapping as the most efficient and economical means currently available to reduce feral hog populations. Of course, a variety of prior art traps and cages have been proposed for such use.

Often, trappers have relied upon large, preassembled cages that are bulky and difficult to handle and deploy. These often have square or rectangular shapes, with a gate or trap door disposed at one or both ends. As herds of feral hogs move about, however, the traps must be relocated and redeployed to follow the herd. However, most known preassembled cages are difficult to handle and relocate, so it can be a time consuming process for a trapper to actively follow meandering hog populations. Typical known designs have several shortcomings. Feral hogs are relatively intelligent, and quickly recognize the potential dangers to them of any trap system. Smaller traps can, in effect, scare off the majority of a herd. Where, for example, a conventional cage traps a single animal, the rest of the hogs often recognize the threat and leave the area. Of course, the damages that a trapped wild animal can inflict upon a poorly built or structurally weak trap are well known. However, where traps of conventional designs are merely reinforced and ruggedized, without substantial redesign, their increased weight and bulk interfere with mobility, and the potential speed realized by the trapper.

Another disadvantage of many prior art cages is that the trap door and associated tripping mechanisms are often unreliable. When engaged by a one thousand pound animal, for example, the door may be triggered while the animal has only partly entered the trap, facilitating escape. Another disadvantage of prior art devices is the difficulty in opening the door after the animal has been trapped inside. In order to release the door used with poorly designed, prior art cages, the trapper's body may closely encounter the trapped animal, resulting in potential attacks and injuries.

A typical cage trap is illustrated in U.S. Pat. No. 5,864,982, issued Feb. 2, 1999. This reference discloses a cage trap with a vertically disposed, sliding door at the trap front. A trigger mechanism linked to the door is activated by an animal contacting a bait pan that is placed within the trap. However, traps of this type cannot capture and confine a plurality of large animals such as feral hogs at once.

U.S. Pat. No. 5,199,210 issued Apr. 6, 1993 discloses a cage-type animal trap adapted to capture a single large animal at a time. An elongated, generally rectangular cage comprises roof and floor panels, side panels, and a rear panel. A forward portion has a vertically slidable door guided by tracks in the side panels that is gravity-actuated. Bait disposed within the cage toward the rear panel is supported by a retainer slidably disposed upon the roof panel. An elongated trip rod activated when an animal pushes the bait tray springs the trap and seals the cage. The door is released and moves downwardly in response to gravity. Again, a plurality of large animals cannot be handled all at once. Moreover, trip rods of this type may be broken or damaged by sudden impulsive moves of relatively large and ferocious animals such as trapped feral hogs.

U.S. Pat. No. 8,359,783 issued Jan. 29, 2013 discloses a cage trap having an animal enclosure, with a remote-controlled trap door-opening mechanism. The mechanism is mounted outside the trap and is remotely activated by a transmitter to open a trap door and release a trapped animal when the operator is at a safe distance away.

Relatively large trap arrangements for capturing multiple feral hogs at once are known in the art. Many include a deployable fence comprising a plurality of interfitting, modular fence sections. For example, U.S. Pat. No. 6,772,555 issued Aug. 10, 2004 discloses a portable animal trap for humanely capturing and restraining large animals such as feral hogs. The trap may be field assembled from modular components, including a multi-section fence and an associated gate. Animals are attracted within the trap by bait. A sliding gate supported and released by a sliding gate latch traps the animals when triggered. The modular components comprise square or rectangular wire mesh panels framed by square tubing. Once the individual components are placed in their proper positions, they are joined together by fasteners.

U.S. Pat. No. 7,854,088 issued Dec. 21, 2010 discloses another trap for containing a number of relatively large animals. An entry path (game trail, etc.) extends from the enclosure to an automated drop gate at the entrance. At least one trip arm disposed along the entry can actuate the gate when contacted by animals. The trap is configured to capture a number of herd animals such as wild pigs.

U.S. Pat. No. 8,061,076 issued Nov. 22, 2011 discloses another portable large animal trap designed for capturing multiple wild hogs at once. The trap is firmly secured to the ground by a chain. When hogs or other large animals in the trap root up pins in the ground, the door drops and locks shut.

A variety of modular fence arrangements suitable for use with a large animal trap are known in the art for erecting temporary corrals or animal pens. Such modular fences are transported to a desired location and then deployed by coupling modular fence pieces together to form a temporary fenced enclosure. For example, U.S. Pat. No. 3,741,529 issued Jun. 26, 1973 shows a portable corral formed from a plurality of pivotally-intercoupled panels. The fence panels can be folded into a compact assembly for transportation in a typical horse trailer. When the assembly is unloaded from the trailer, the several panels are connected in a desired configuration to form a temporary corral confining a desired area.

U.S. Pat. No. 3,767,167 issued Oct. 23, 1973 shows a portable fence panel designed for connection to identical panels to form a pen or corral. The generally rectangular panels are interconnected with one another by tubes mounted both at the top and bottom of posts that receive inverted studs mounted on an opposite end post on a companion panel. The studs on one panel end pivotally mate within registered tubes on the adjoining panels. By providing a trio of tubes, a four-way fence corner can be constructed.

U.S. Pat. No. 4,371,148 issued Feb. 1, 1983 shows an enclosure using multiple sections that can be pivotally interconnected together by hinges and moved to assume a variety of configurations. A circular enclosure can be made from adjacent, arcuate sections that are pivotally interconnected by spaced apart hinges. Multiple hinges including pins received in sleeves are employed to pivot connected sections.

U.S. Pat. No. 4,537,151 issued Aug. 27, 1985 discloses a portable corral comprising a plurality of panels which are rotatably coupled to each other by sleeves. The panels may be folded and mounted on a trailer for transportation to a selected site. Each panel has both horizontal and vertical members. Supporting legs furnishing support for the panels are locked in place by pins. For transportation the panels are folded and placed on a support plate fastened to the trailer.

U.S. Pat. No. 4,844,424 issued Jul. 4, 1989 shows a portable fence made from multiple rectangular sections coupled together with pins and sockets. The couplings are formed from parallel sleeves which are welded to the frame. When the outermost sleeves of the couplings on opposite ends of two adjacent frames are axially aligned and a pin is inserted to connect adjacent sections.

U.S. Design Pat. No. 552,751 issued Oct. 9, 2007 shows a modular corral component suitable for use in conjunction with portable corral or fencing structures.

The art also reflects improved transportation means for hauling multiple-component fences, traps, or corrals. For example, U.S. Pat. No. 5,280,944 issued Jan. 25, 1994 discloses a carrier for transporting fence panels which are supported between a pair of vertical support posts mounted on a trailer. An extensible alignment bar attached to a support post extends across the front of the fence panels to keep the fence panels aligned. Hooks wrap around the outermost fence panels to hold them together.

Other art pertaining to fence hauling arrangements and modified trailers is discussed in the various other patents referenced above.

As implied above, to trap large quantities of wandering feral hogs an easily deployable and readily transportable trap system must be employed. A reliable gate must be integrated within a system comprising multiple fence sections that can be rapidly deployed once a target area is reached. Conversely, when the trap is to be moved to a new location, the fence panels must easily disassemble, and an efficient transportation arrangement for the panels must exist. Cumbersome stacks or folded bundles of fence sections are difficult to lift and manipulate. Fence portions should be easily stored and secured within a trailer without excessive labor, and without wasting time. However, when traveling, the fence modules should be stably secured within a housing or trailer that is adapted to handle them efficiently, without vibrating and shifting about over the road.

When deployed the panels must easily hinge together and pin to ground for stability and speed. Importantly, erected fence portions of an adequate large animal trap must be strong and durable enough to withstand the pressure and forces encountered in response to feral hogs (or other large animals such as horses) that can weigh in excess of one thousand pounds. Particularly for feral hogs, the corral fence and gate components must be designed to prevent animal climbing and escape.

Moreover, to entice hogs to enter the trap, the entryway threshold preferably must be concealable, without sacrificing the structural integrity of the gate. In prior art designs the gate bottom forming the corral entryway threshold can normally be seen by animals. It should be appreciated that many animals, such as feral hogs, are afraid to traverse metal structures, especially when associated with traps, so hogs often refrain from entering such an enclosure. Thus, where there is visually apparent, man-made structure occupying the entranceway or the entranceway threshold of a trap or corral, the likelihood of capture is reduced. On the other hand, where deployable gates have hitherto been fabricated in an inverted-U shape, where there is no bottom cross-piece or structure to scare away animals, the structural integrity is compromised, and such designs cannot non-destructively restrain large, captured animals (i.e., in the 1000 pound and above category) without injury or damage.

BRIEF SUMMARY OF THE INVENTION

This invention comprises a readily transportable, configurable trap system for capturing and non-lethally retaining a large number of large animals, such as feral hogs, wild horses, or the like.

The preferred trapping system comprises a mobile platform or other means for conveyance that transports a deployable corral for erection and deployment at a suitable trapping site. Preferably a custom trailer is utilized for transporting the apparatus. The corral is engineered for quick and easy erection and/or take-down, and it can be custom configured at a trapping site in a variety of sizes and shapes.

The preferred corral comprises a modular fence that is erected on-site from multiple fence panels that are deployed end-to-end and then hinged together. A gate assembly, comprising a trap door, is similarly coupled between a pair of fence elements. Preferably the gate assembly employs a concealable entrance threshold that does not scare the animals.

Stakes secure the fence panels to the ground to reinforce the corral and form a stable enclosure. Importantly the fence panels are stored in a highly stable and organized arrangement within the mobile platform that is especially designed for the quick storage and deployment of the preferred corral fencing and gates(s). In one form the preferred fence panels are designed with special voids or gaps, to prevent animal climbing and escape.

The preferred mode of transportation is with a specialized trailer. The preferred trailer comprises a rigid, upright confining frame structure adapted to constrain the various corral components in a stable, space-saving configuration. An elevated, channeled ceiling is disposed above a channeled floor. Fence panels slidably register within spaced apart upper and lower ceiling and floor channels, so they are maintained in a parallel spaced-apart configuration during transportation. Similarly, suitable upper and lower aligned channels slidably receive and then constrain the gate assembly during transportation.

Thus a basic object of my invention is to provide a heavy duty, user-configurable animal trap system that can be easily transported to a suitable site for rapid deployment in a desired shape, size and configuration.

A basic object is to humanely trap large animals such as feral hogs, wild horses, and elk.

A related object is to trap large quantities of animals, particularly feral hogs, all at once.

Similarly, it is an important object of my invention to trap large feral animals without injury.

Another basic object is to provide a universal trap that is configurable and deployable for use with a large variety of domestic and wild animals.

Yet another basic object is to provide a mobile, custom configurable corral and trapping system utilizing the corral, that can be deployed in various sizes for capturing a variety of animals.

Another object is to provide a trap of the character described that can capture a plurality of relatively large and heavy wild animals, such as feral hogs, and which can reliably restrain them once caught without hurting the hogs, and without sustaining damage from them.

A related object is to provide a fence panel design suitable for traps of the character described that prevents feral hogs or other captured animals from climbing and escaping.

An important object is to provide a modified trailer specially adapted to transport and dispense a plurality of heavy duty modular fence components suitable for use with heavy-duty, deployable traps, corrals or fences.

Another object is to provide a trap system of the character described that facilitates rapid and easy erection of fences or corral-type enclosures of a variety of user-selectable sizes and shapes.

A related object is to provide a trap system of the character described, and a customizable corral for the trap system, that can be adapted rapidly to different terrains and irregular ground.

Another object is to provide a portable fence and corral system for confining livestock or other large, domestic animals.

Another object of the present invention is to provide a portable, modular trap comprising a user-deployable fence structure that can be assembled into straight or curved portions as conditions necessitate.

It is also an object to provide portable fence panels of strong, durable construction, which are capable of being quickly, pivotally connected to cooperating panels, to provide a holding pen or enclosure for a variety of animals, whether domestic or wild.

A related object is to provide a gate system for use with the aforesaid fence panels that has a disguised or conceivable threshold, so that target animals are not frightened away.

Another object is to provide a portable fence panel system designed such that erection or dissassembly can be accomplished by a minimum of workmen in a minimum of time.

Another basic object of the invention is to provide a portable fence panel system which can form rectangular and polygonal pens of desired sizes and shapes.

Yet another object is to provide a portable fencing system for temporarily deploying holding pens, field corrals, temporary stalls, and the like for a variety of animals.

It is another basic object of the present invention to provide a portable animal trap for capturing one or more large animals at once without harming them, and without allowing them to escape.

Another important object of the present invention to provide a trap of the character described which has a reliable trigger mechanism.

Still another object of the invention is to provide a deployable, modular trap which has strength comparable to a cage trap, but which can be custom configured and deployed for capturing a large number of animals all at once.

It is another object of this invention to provide an improved, portable folding fence system of the character described wherein the transportation means, i.e., a trailer, is customized to quickly store and stabilize individual panels when transported.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 12 is a fragmentary, rear isometric view of the preferred trailer similar to FIG. 9, but illustrating the opposite side;

DETAILED DESCRIPTION OF THE DRAWINGS

Figure 5:
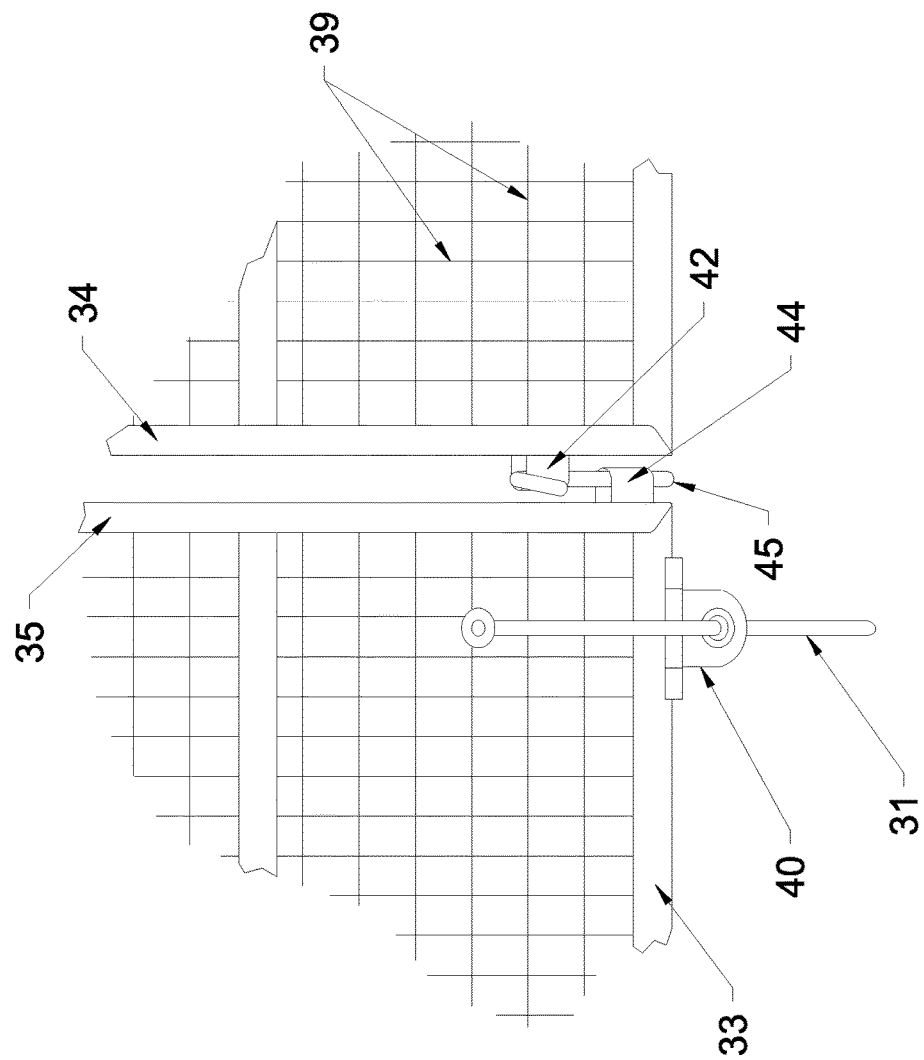
FIG. 5 is an enlarged, fragmentary, isometric view of a portion of the hinge area taken generally from circled region "5" in FIG. 4.
Figure 6:
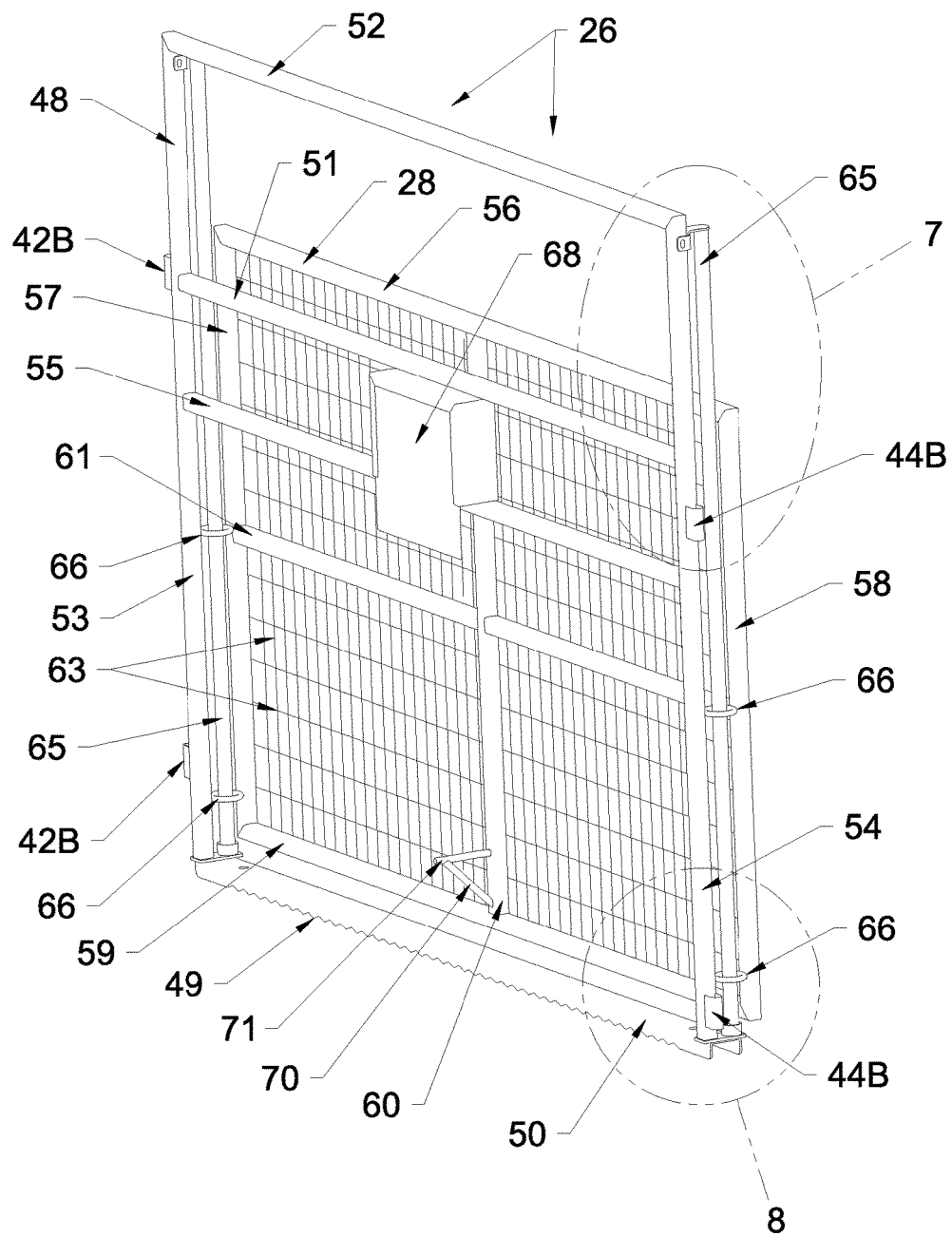
FIG. 6 is an isometric view of one form of a gate and a sliding trap door.
Figure 21:
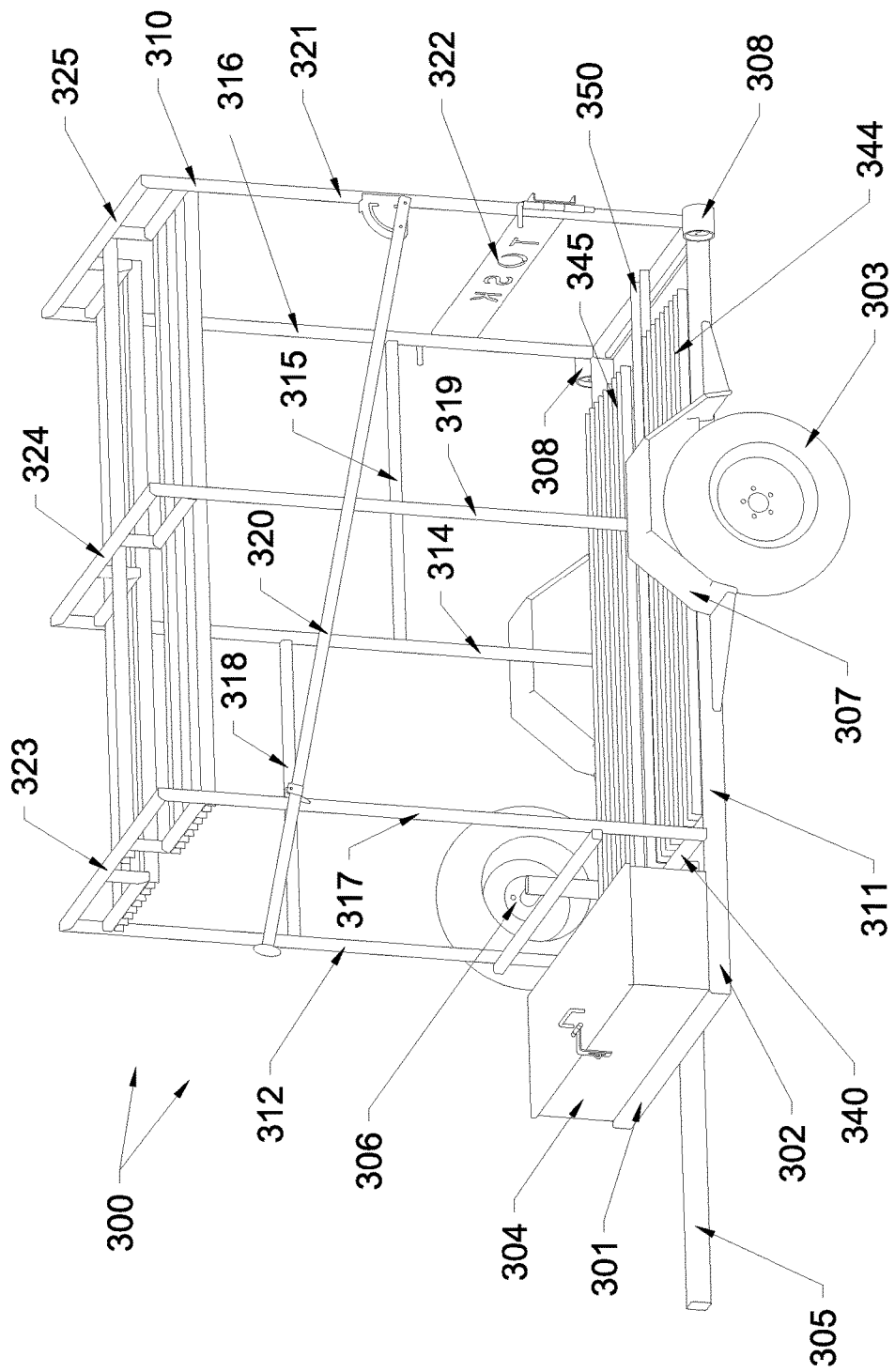
FIG. 21 is a fragmentary, isometric view of an alternative system trailer used for transporting the preferred corral fence and door components, with the trailer unloaded.
Figure 22:
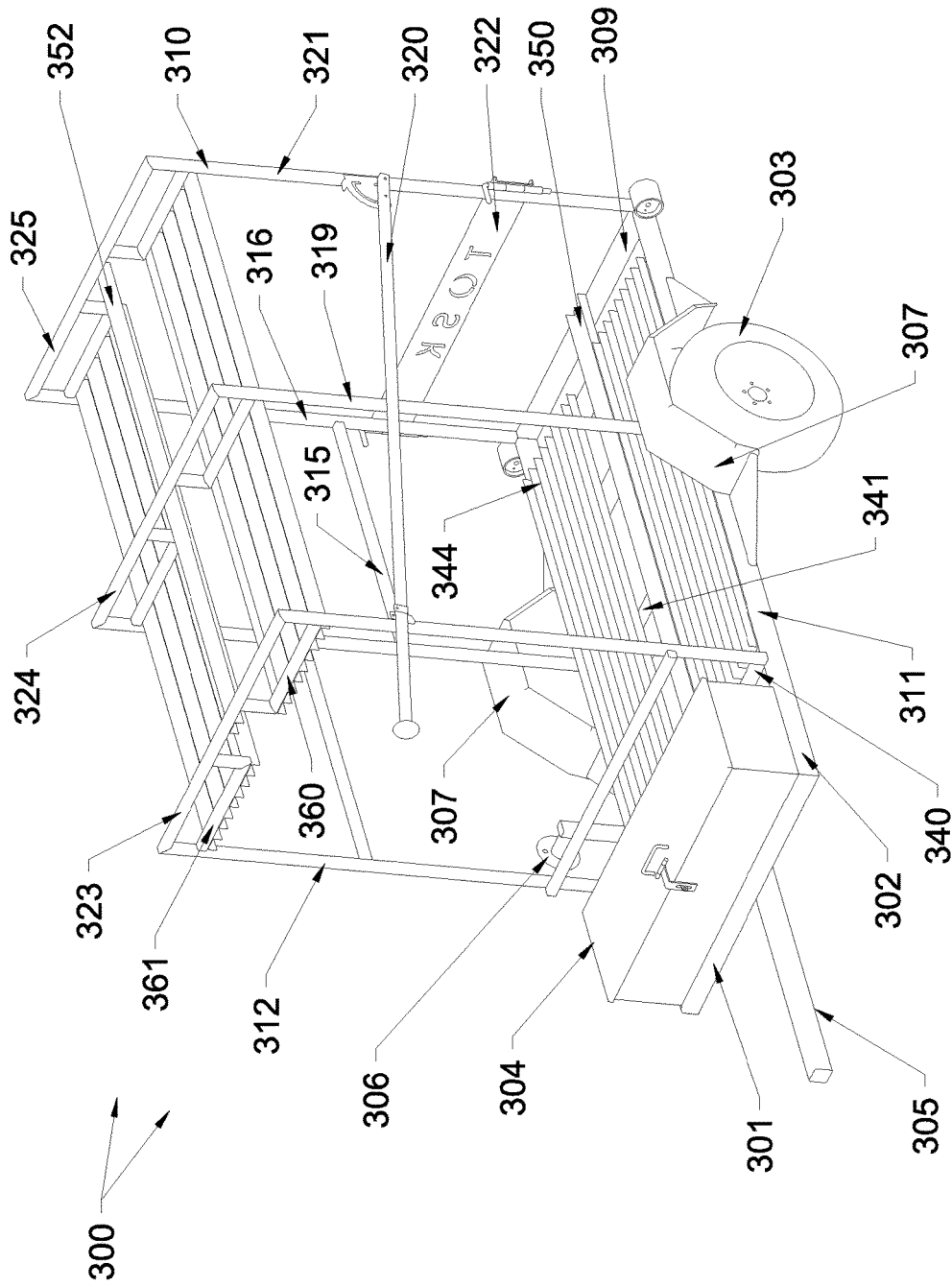
FIG. 22 is a fragmentary, frontal isometric view of the alternative trailer of FIG. 21.

With initial reference now directed to FIGS. 1, 2, and 13-15 of the appended drawings, one embodiment of my portable animal trap system constructed in accordance with a preferred mode of the invention has been generally designated by the reference numeral 20. The system 20 comprises a modular corral 22 and a mobile platform means afforded by a truck or trailer 200 for conveyance and delivery. The corral 22 is ideally deployed upon somewhat flat ground at a trapping site after transportation by trailers 200 (FIG. 13-15) or 300 (FIGS. 21, 22). When unloaded and deployed, the corral 22 encircles the selected area of deployment 23 to form a pen in which target animals 21, such as wild horses, elk, or feral hogs, may be restrained after capture. The corral 22 (FIGS. 1, 2) is formed from a plurality of interlinked, modular fence panels 24 (FIGS. 3-5) that occupy and define a corral periphery, along with various accessories and at least one gate described later (FIG. 6). Alternatively the corral may be formed from anti-climbing fence panels 24B (FIGS. 28, 29) described latter that are preferred for feral hogs which are very adept at climbing over fences.

Figure 1:
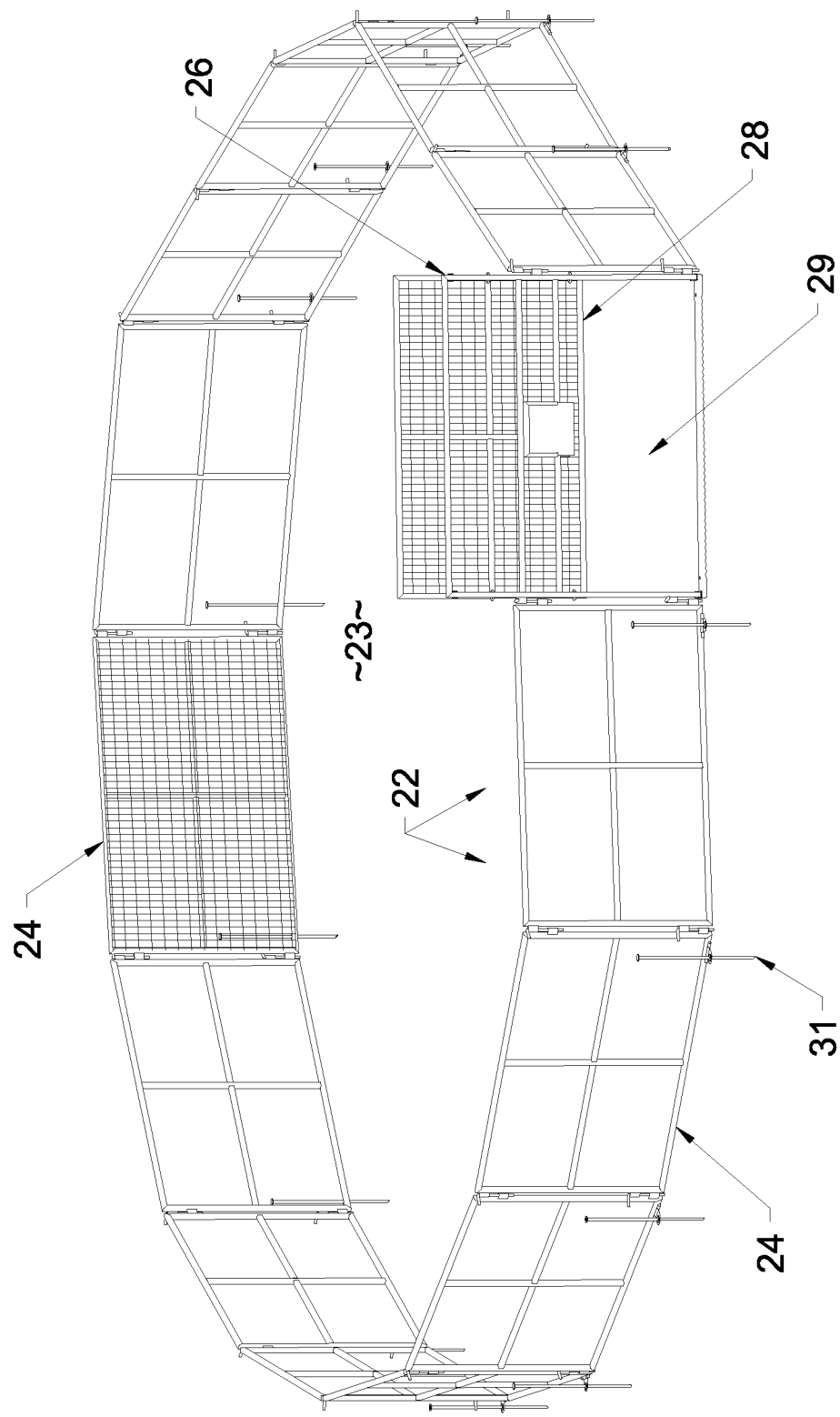
FIG. 1 is an isometric view of the preferred corral associated with the trap system, showing it deployed with the trap door in a set or open position, and with the fence elements deployed in one of a variety of possible, geometric configurations.
Figure 2:
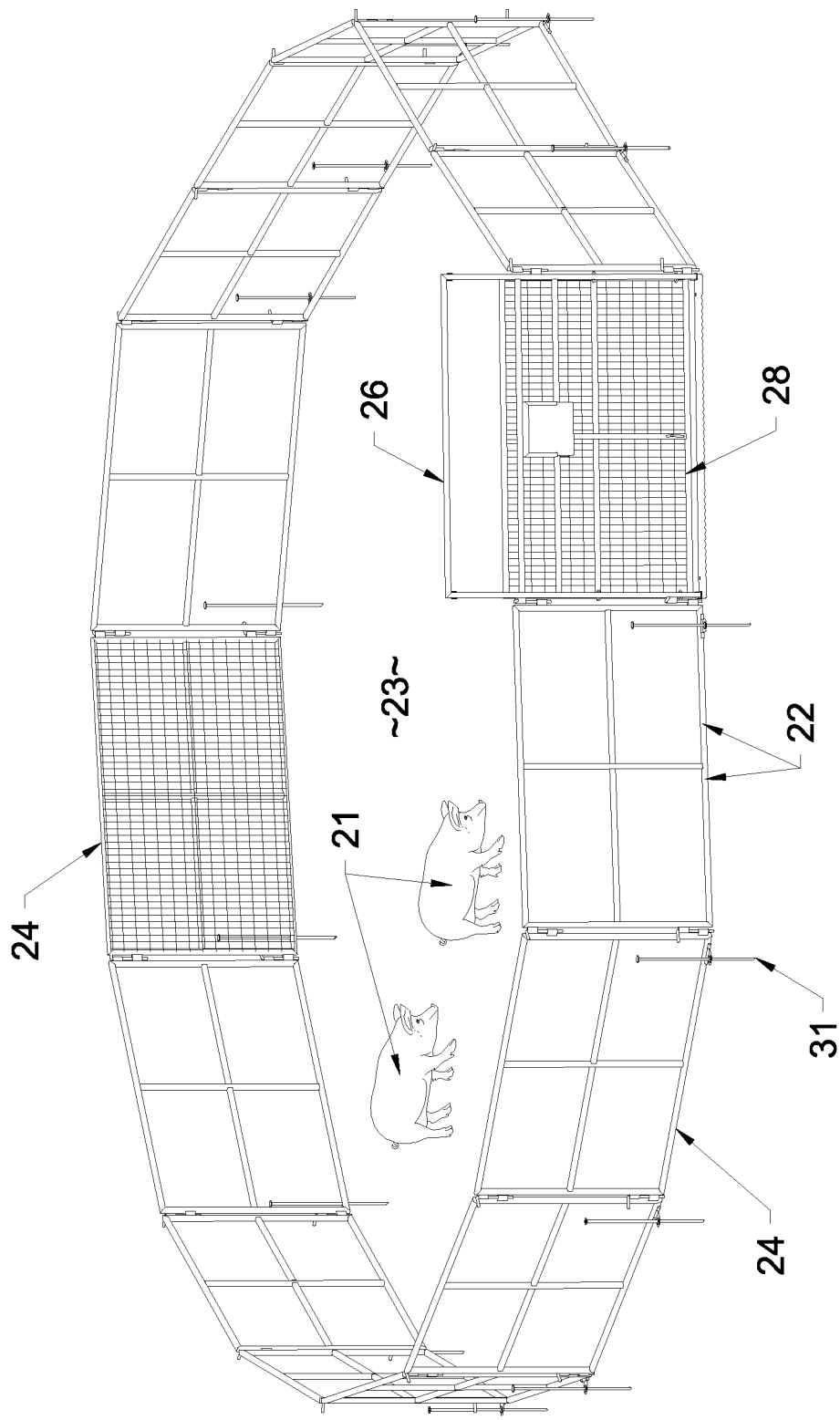
FIG. 2 is an isometric view similar to FIG. 1, but showing the trap door closed, as it appears after the trap system is triggered.
Figure 3:
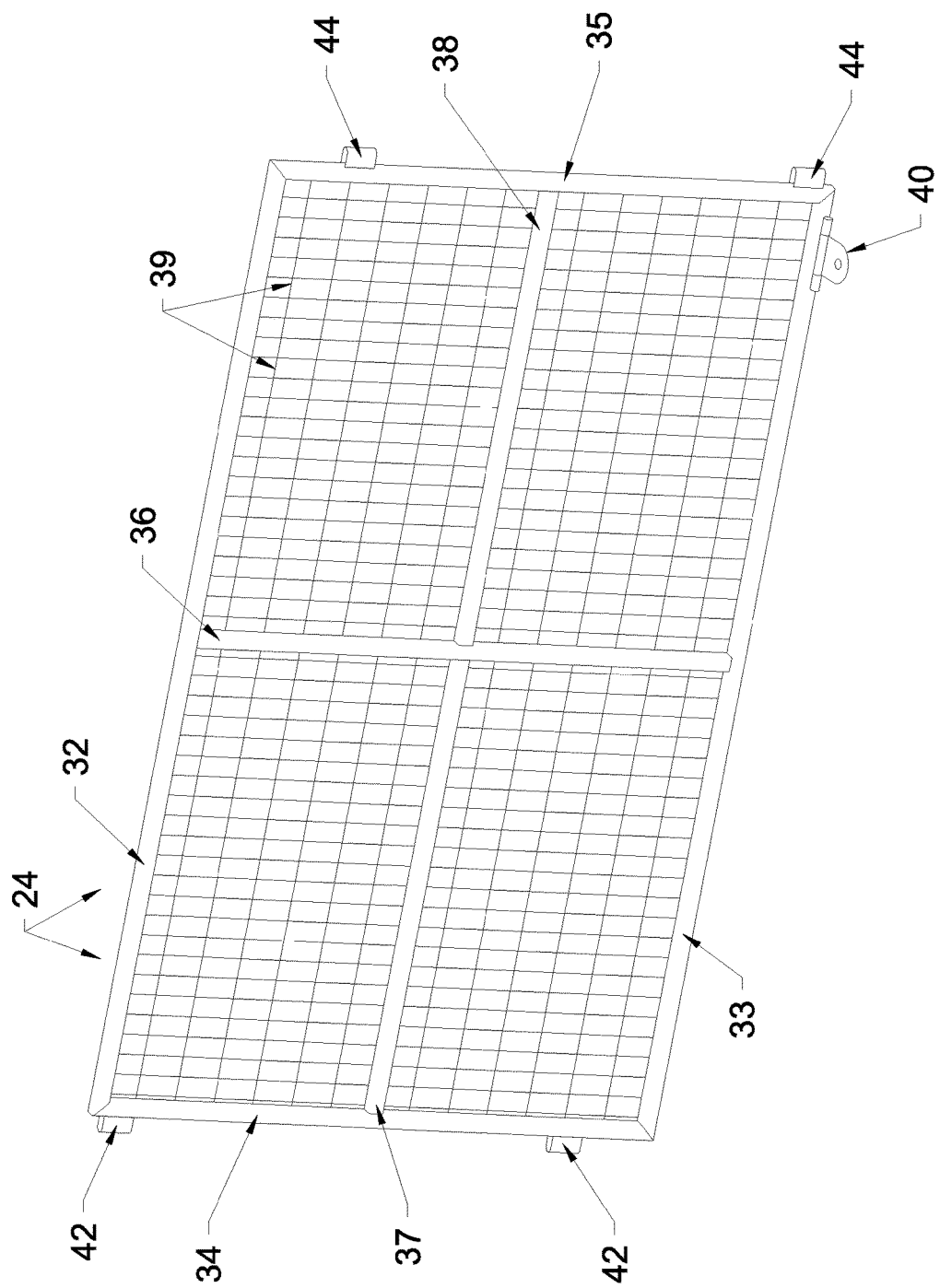
FIG. 3 is an enlarged, isometric view showing a typical fence panel of the type preferred for large animals such as horses.

Preferably the various fence panels 24 are generally rectangular, as best seen in FIG. 3. Each fence panel 24 has opposite ends provided with hinge structure explained and illustrated in conjunction with FIGS. 4 and 5 that pivotally couples adjacent panels together when the corral 22 is deployed. The corral 22 surrounds enclosed pen area 23, access to or from which is enabled or foreclosed by a gate 26 (FIG. 1) that supports a slidable trap door 28 that selectively blocks or exposes a corral entryway 29 (FIG. 1). Door 28 is slidably captivated between gate sides 30 (FIGS. 1, 7) on opposite sides of entryway 29. Gate 26 and trap door 28 are detailed in FIGS. 6, 7, and 8. During installation, the fence panels 24 (and thus the resultant corral 22) are secured to the ground by a plurality of stakes 31 (FIGS. 4, 5) that are driven into the ground during corral erection.

As best seen in FIG. 3, a typical fence panel 24 comprises a rigid, generally rectangular structure comprising an elongated, rigid top rail 32 and a parallel bottom rail 33 that are braced together with parallel end rails 34 and 35. Fence panels 24, which may be four to six feet tall, are preferred for trapping larger animals such as wild horses. (As explained later, for climbing animals such as feral hogs, the anti-climbing fence panels 24B described later are preferred). Reinforcement is provided by a vertical cross rail 36 and a pair of horizontal braces 37 and 38 which divide the fence panel 24 into quarter panels, each of which is provided by conventional, wire fence webbing 39. Each bottom rail 33 is provided with a hinged stake tab 40 (FIGS. 3, 5) through which stakes 31 (FIG. 4) may be driven to secure the deployed corral upon the ground 23. The tab 40 is deployed perpendicularly to the fence panel when a stake is installed. To enhance clearance, the tabs 40 may be deployed vertically (i.e., flushly aligned with the plane of a fence panel) when the fence panels are stowed.

Figure 4:
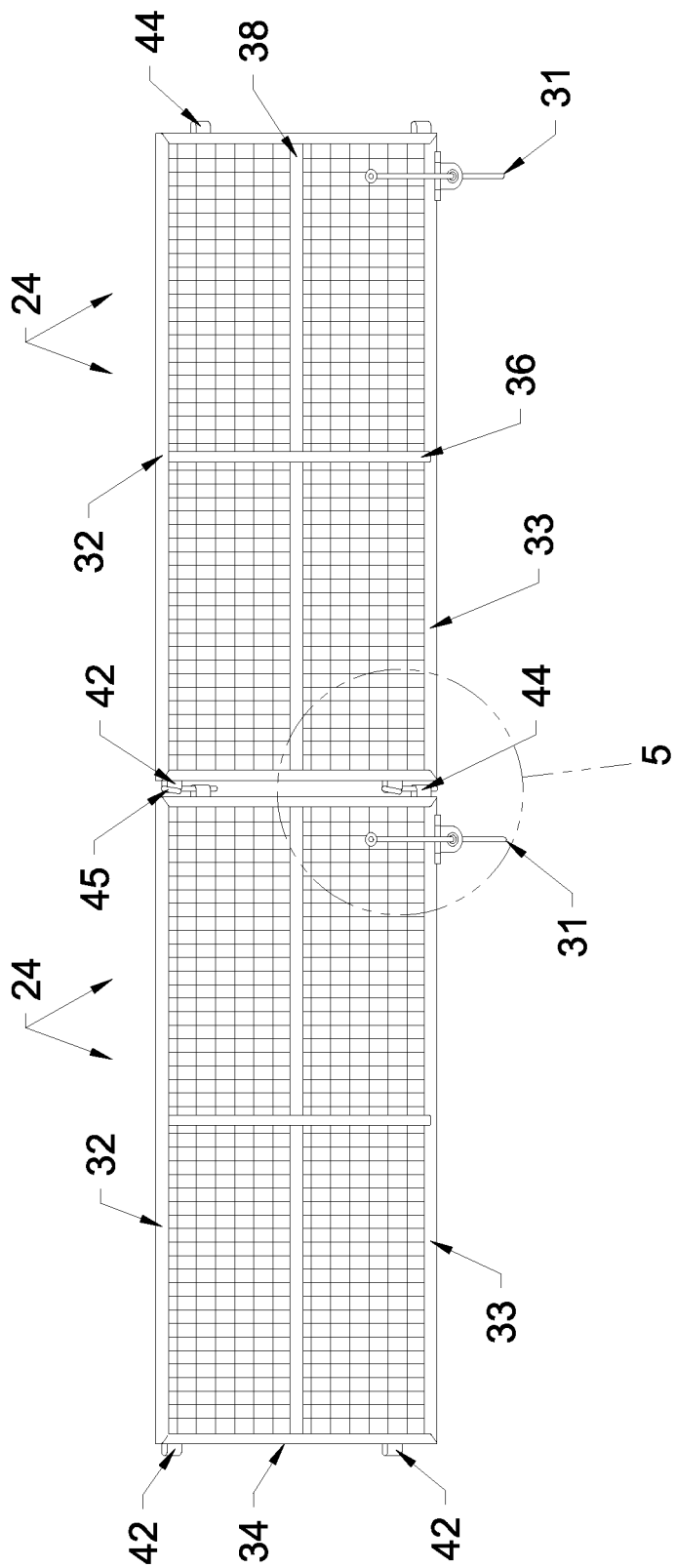
FIG. 4 is an enlarged, fragmentary isometric view illustrating assembled, adjacent fence panels.

Means are provided for removably coupling adjacent fence panels together. It is preferred that they be hinged or pivotally coupled together. Preferably, at the left of each fence panel 24 there are a pair of rigid, vertically spaced apart sleeves 42 that are welded to end rail 34. There are a pair of similar spaced-apart sleeves 44 on the right side of the panel 24, welded to end rail 35. Sleeves 44 are vertically spaced apart from one another the same distance that sleeves 42 are spaced apart; however, sleeves 44 are lower than sleeves 42 so that, when two fence panels 24 are placed side-by-side, as illustrated in FIGS. 4 and 5, the sleeves 42 on one panel 24 will axially, vertically align with spaced-apart sleeves 42 on the neighboring panel 24, so that they may be flexibly or pivotally joined together with removable pins 45 (FIG. 5.)

Figure 7:
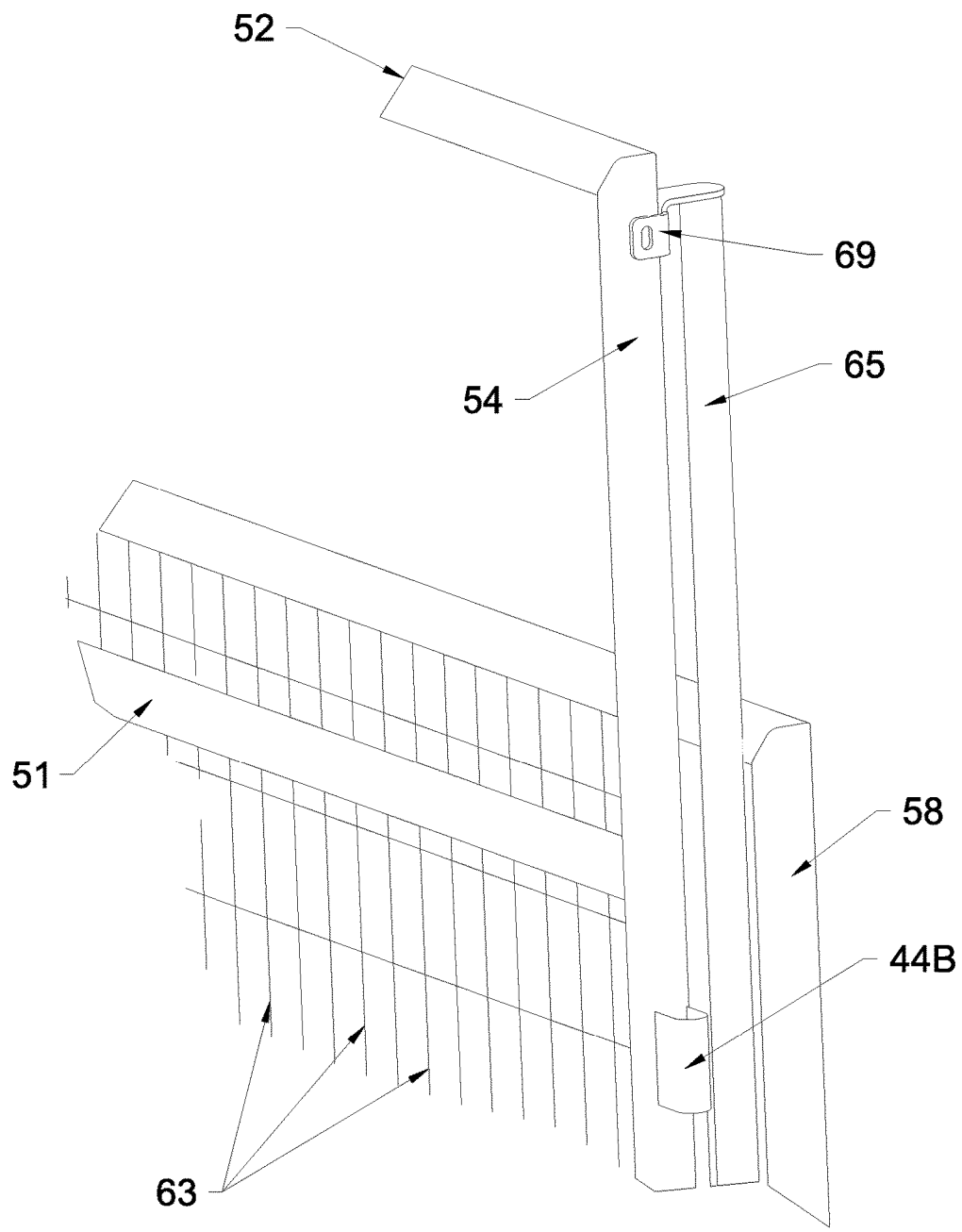
FIG. 7 is an enlarged, fragmentary isometric view taken generally from circled region "7" in FIG. 6.
Figure 8:
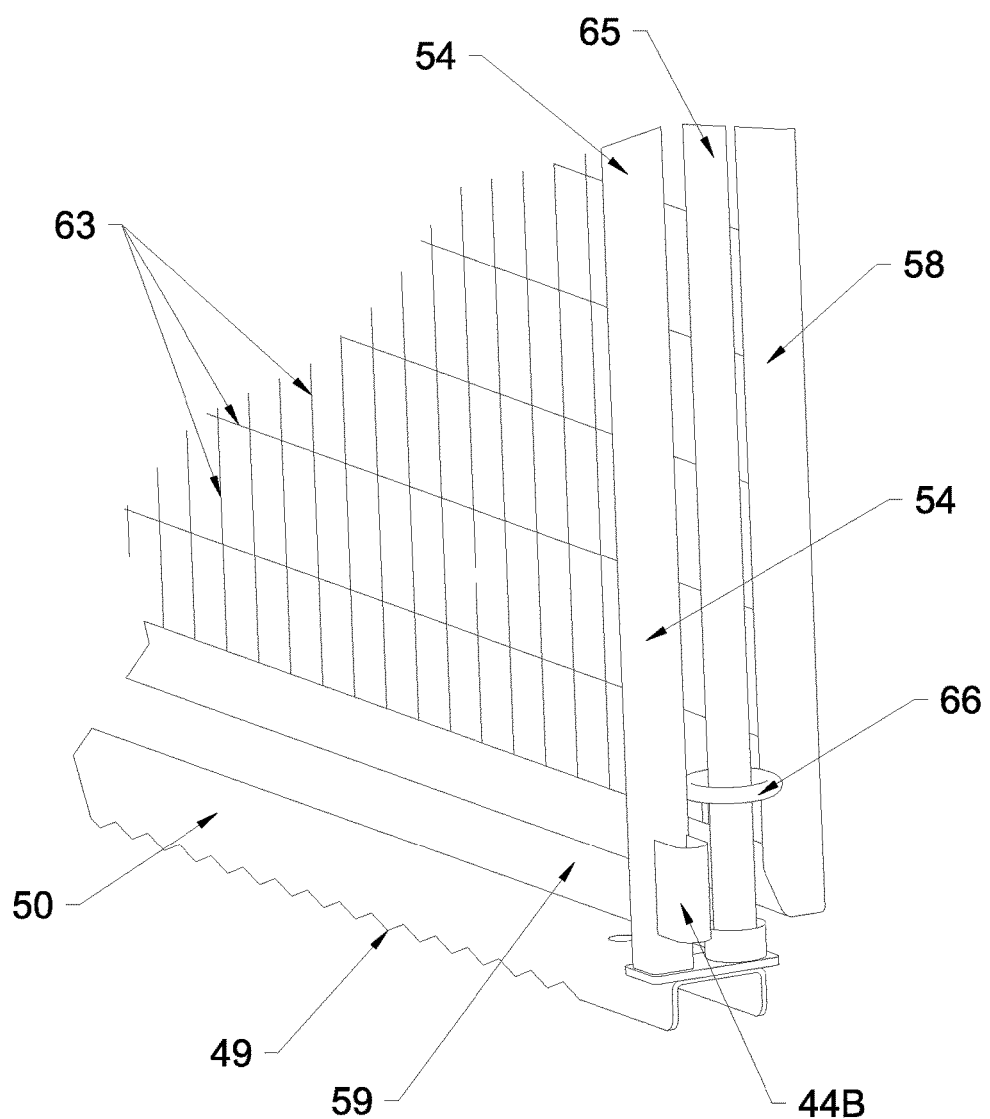
FIG. 8 is an enlarged, fragmentary isometric view taken generally from circled region "8" in FIG. 6.

Referencing FIGS. 6-8, the rigid gate 26 is generally rectangular. It supports a reciprocally displaceable trap door 28 that closes or opens the corral by blocking or unblocking the corral entranceway. The gate 26 comprises a rigid, supporting gate frame 48 with a rigid, elongated, concealment piece 49 at the gate bottom. Concealment piece 49, which occupies the entranceway threshold, has a jagged, bottom edge 50 that can be hidden within the ground. Thus, with the instant design, the gate bottom is concealable. During the corral erection process, the gate 26 may be moved into place and then manually moved back and forth like a saw, such that the edge 50 digs piece 49 into the ground for hiding the lower structure of the gate for concealment within the entryway threshold. Thus threshold concealment piece 49 hides the bottom of the gate to prevent scaring the hogs away from the corral entryway.

Figure 30:
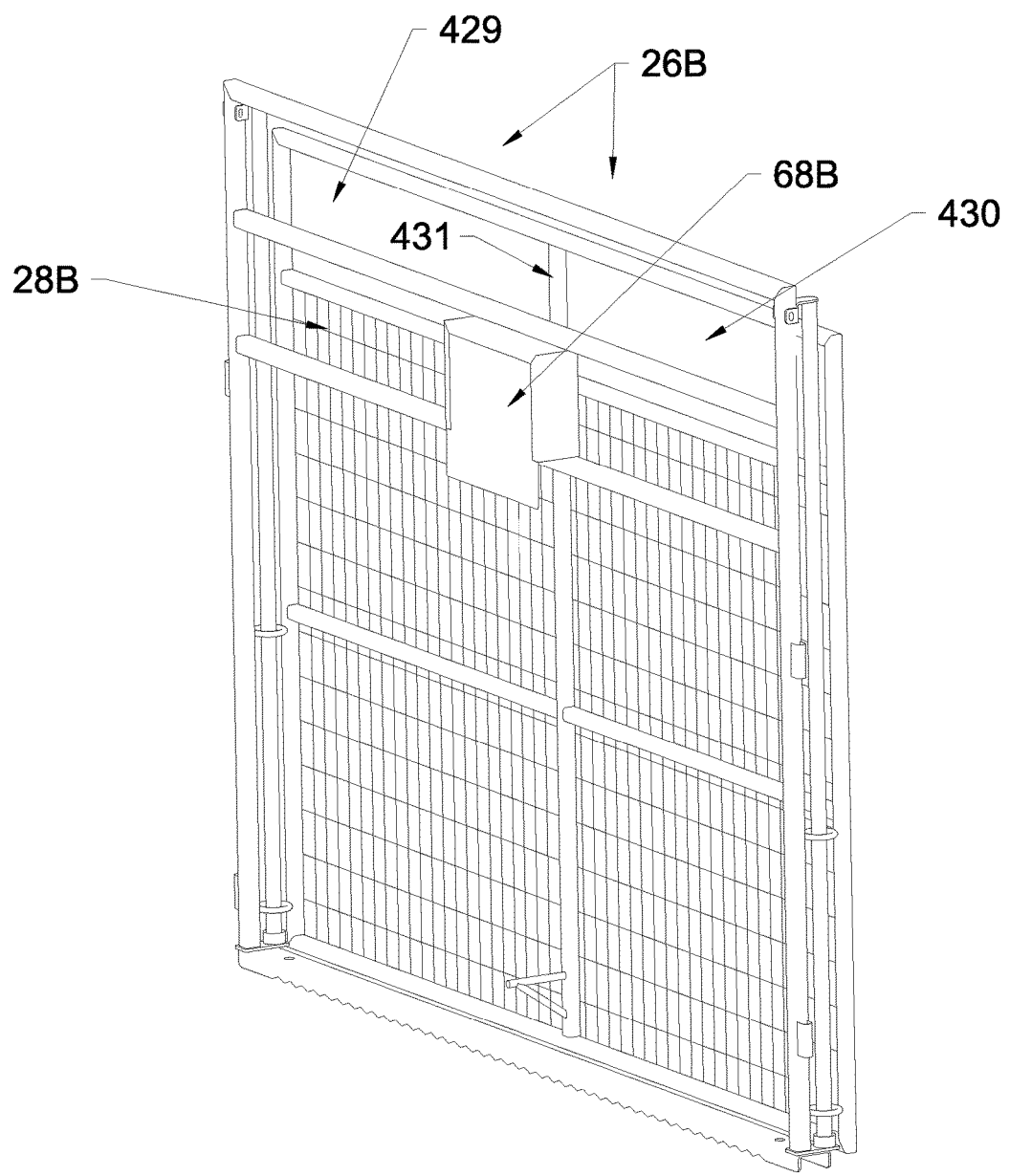

Gate frame 48 supports an upper, rigid, top piece 52 that extends between rigid, spaced-apart frame sides 53, 54 (FIG. 6). As with the fence panels 24 discussed earlier, there are parallel, frame reinforcement cross pieces 51, 55. Gate frame side 53 has a pair of spaced apart sleeves 42B that function the same as sleeves 42 on a fence panel 24. Also, gate frame 48 has spaced apart sleeves 44B on its side 54 that are equivalent to sleeves 44 (FIG. 4) so that the gate 26 may be coupled to adjoining fence panels 24 the same way that the fence panels of FIG. 4 are coupled together (i.e., with pins 45 as if FIG. 5). The anti-climbing gate 26B (FIG. 30) described later is similar, but is modified to prevent hogs from climbing.

The gates' slidable trap door 28 comprises a rigid top rail 56 extending between sides 57 and 58 and a rigid bottom 59. There are vertical cross pieces 60 and horizontal cross pieces 61 for reinforcing the trap door. Webbing 63 exists between various sides and cross piece reinforcements. Preferably the gate frame 48 supports a pair of offset slide tubes 65 that are secured to frame sides 53 and 54 by suitable brackets 69 (FIG. 7). The trap door sides 57 and 58 each support slide rings 66 that are slidably captivated on slide tubes 65 so that the trap door 28 is displaceable vertically. When triggered (FIG. 8), the gate's trap door 28 may quickly slide down from the "set position" of FIG. 7 to forcibly close the gate in response to gravity. The anti-climbing trap door 28B (FIG. 30) discussed later is specially designed to prevent hogs from climbing over it.

Figure 19:
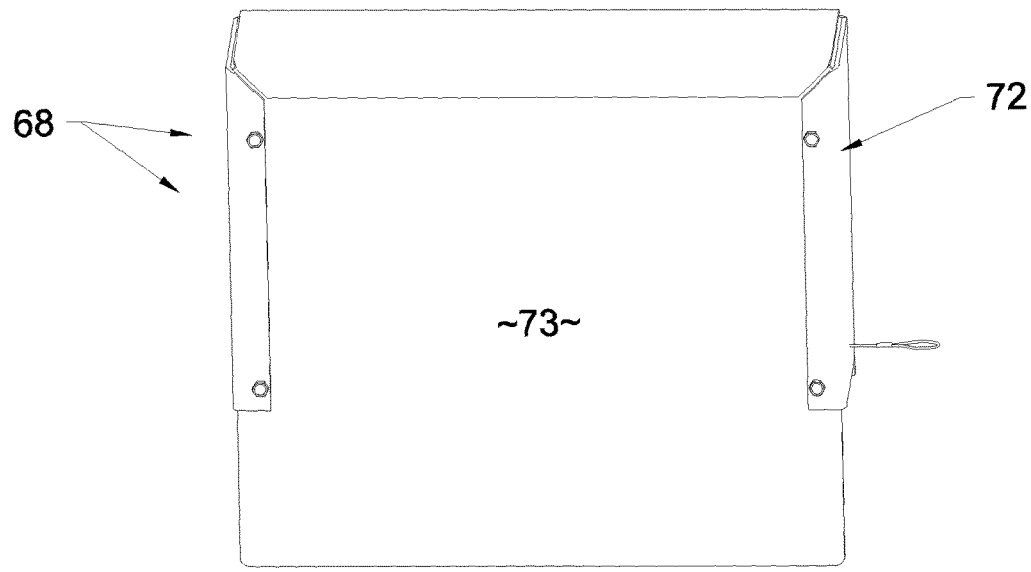
FIG. 19 is a frontal elevational view of the preferred trap door controller cabinet.

Trap triggering can be effectuated manually, through animal contact, or preferably through remote control. Preferably, trap triggering and gate actuation is controlled by a commercial gate controller 68 (FIGS. 20, 21) secured to and between gate frame cross pieces 51, 55 (FIG. 6). The controller 68 comprises a GSM (i.e., Global System for Mobile Communication) switch with a conventional cell-phone activated latch release. The controller 68 comprises a substantially sealed cabinet 72 (FIG. 19) engaging pieces 51, 55 (FIG. 6) that is covered by removable face plate 73. Controller 68 engages trap door 28 by engaging a clasp structure 70 (FIG. 6) having a rigid pin portion 71 that projects horizontally outwardly from the trap door 28 from cross piece 60.

Figure 9:
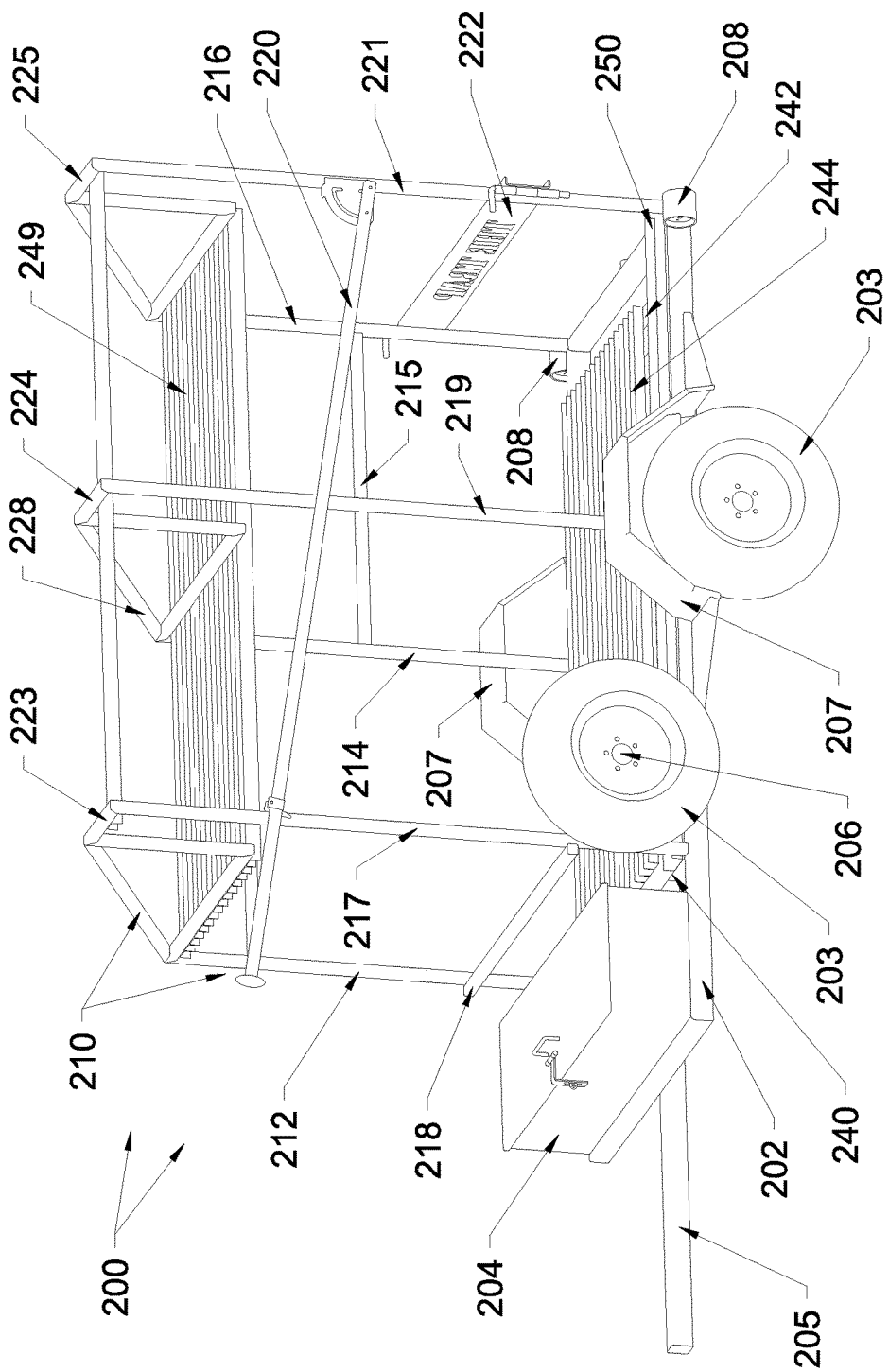
FIG. 9 is a fragmentary, isometric view of the a system trailer used for transporting the preferred corral fence and door components.
Figure 20:
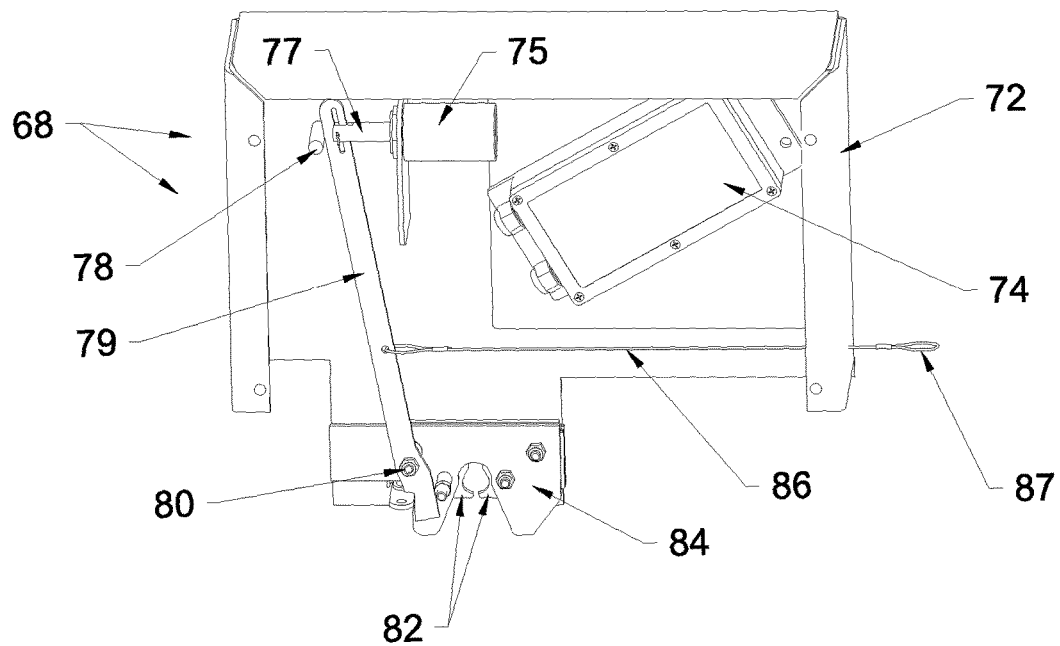
FIG. 20 is a frontal elevational view of the controller cabinet with the face plate removed, showing the cabinet interior and major electrical parts.

With primary reference directed to FIG. 20, the GSM comprises a remotely-activated switching unit 74 that controls a solenoid 75 to retain or drop the trap door 28. The solenoid 75 activates a plunger 77 connected to a lever 79 that is pivoted at fastener 80. Plunger displacement is limited by a stop 78 (FIG. 20). A pair of opposed jaws 82 (FIG. 20) controlled by lever 79 can grip pin 71 (FIG. 6) to retain the trap door 28 in the upper, open position (i.e., FIG. 7). The jaws 82 are normally spring biased together. When switching unit 74 activates solenoid 75 to retract plunger 77, lever 79 deflects and forces jaws 82 apart, freeing pin 71 on the trap door which then drops, closing the gate. Controller 68 can be activated by a cell phone from a distance. A suitable antenna to interface with the controller 68 can be secured to antenna mounts 220 (i.e., FIG. 9) or 320 (i.e., FIG. 21) described hereinafter.

A manual release cord 86 (FIG. 20) coupled to lever 79 extends exteriorly from the cabinet interior, terminating in manually graspable handle portion 87. For manually triggering the trap or releasing the gate, handle portion 87 may be manually pulled, either directly or through a suitable elongated extension tied to portion 87. Suitable conventional animal-activated trip wires or trip mechanisms may be connected to handle portion 87 as well, to deflect cord 86 for triggering. However, the last mentioned type of triggering arrangement is not preferred because trap activation may occur when only a single animal is in the corral, defeating the trap's purpose of capturing numerous animals at once.

The controller 68 releases the trap door 28 upon a suitable signal or activation command programmed by the user either through a cellular telephone, radio connection, or through direct "hands on" activation. Because of the design of the trap, numerous hogs 21 (FIG. 2) can enter the trap, and hogs will not become "spooked" and leave or run away when slightly agitated. This means that large numbers of hogs 21 can be trapped at once, and capturing them is enhanced by remote cell phone control and monitoring. When using remote, cell-phone activation, the user may be watching the trap through a remote monitor TV camera also interconnected via cell phone.

Figure 13:
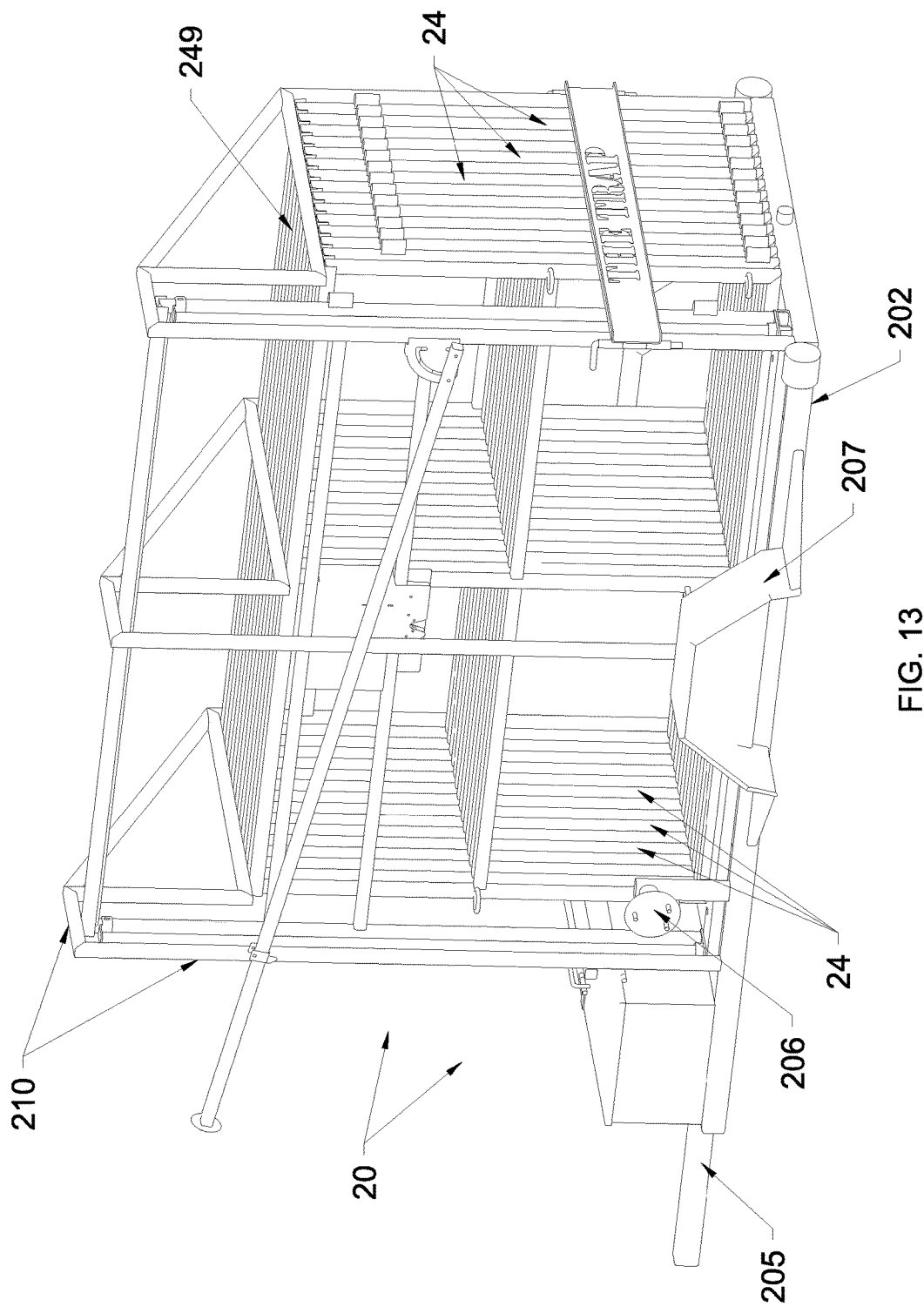
FIG. 13 is a fragmentary, isometric view of the undeployed system, i.e., showing a loaded trailer and illustrating placement of the gate, and various fence panels and accessories.
Figure 14:
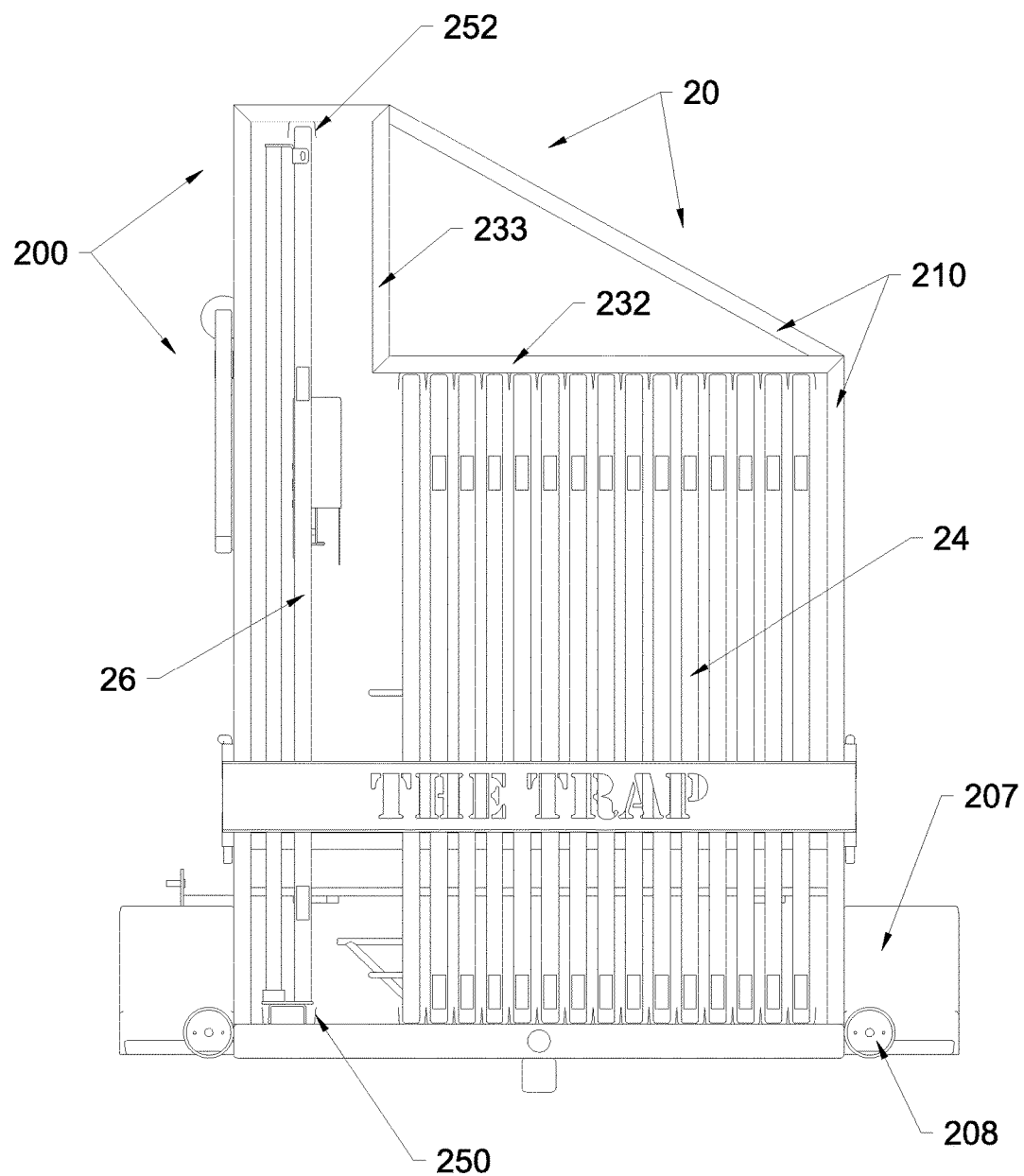
FIG. 14 is a fragmentary, rear plan view of the undeployed system, generally from a position to the right of FIG. 13.
Figure 15:
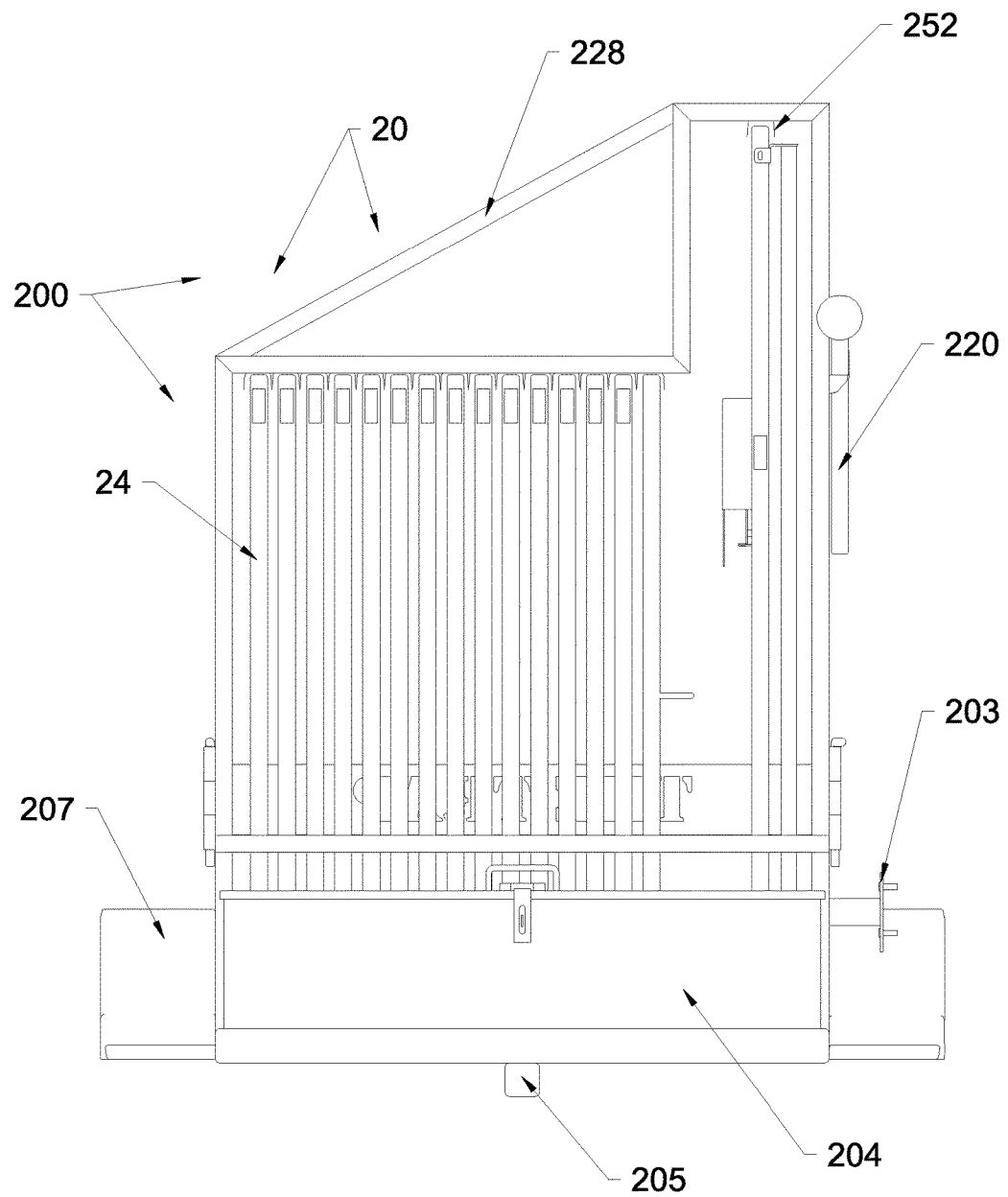
FIG. 15 is a fragmentary front plan view of the undeployed system, taken generally from a position to the left of FIG. 13.

The instant trap system 20 comprises a mobile platform for storing and transporting its parts. Such a platform could be provided by a modified truck, a suitable trailer, or even a boat where feral animals are to be trapped upon river islands, which is a common practice along the Arkansas, Ouchita, and/or Mississippi rivers. However, with reference now directed generally to FIGS. 9-15, the preferred mobile platform for system 20 comprises a special trailer, generally designated by the reference numeral 200, that is specially adapted for hauling corral 22 and the various corral parts. The preferred alternative trailer 300 (i.e., FIGS. 21, 22) is discussed later. Each trailer 200, 300 can efficiently stow various fence panels 24, the gate apparatus 26, that are all neatly and stably secured within the trailer. In FIGS. 13-15 the trailer 200 is shown loaded, wherein the various fence panels 24 and gate structures and accessories such as stakes 31 and pins 45 (FIG. 5) are safely stowed in the preferred manner. Trailer 200 is shown unloaded in FIGS. 9-11.

Figure 11:
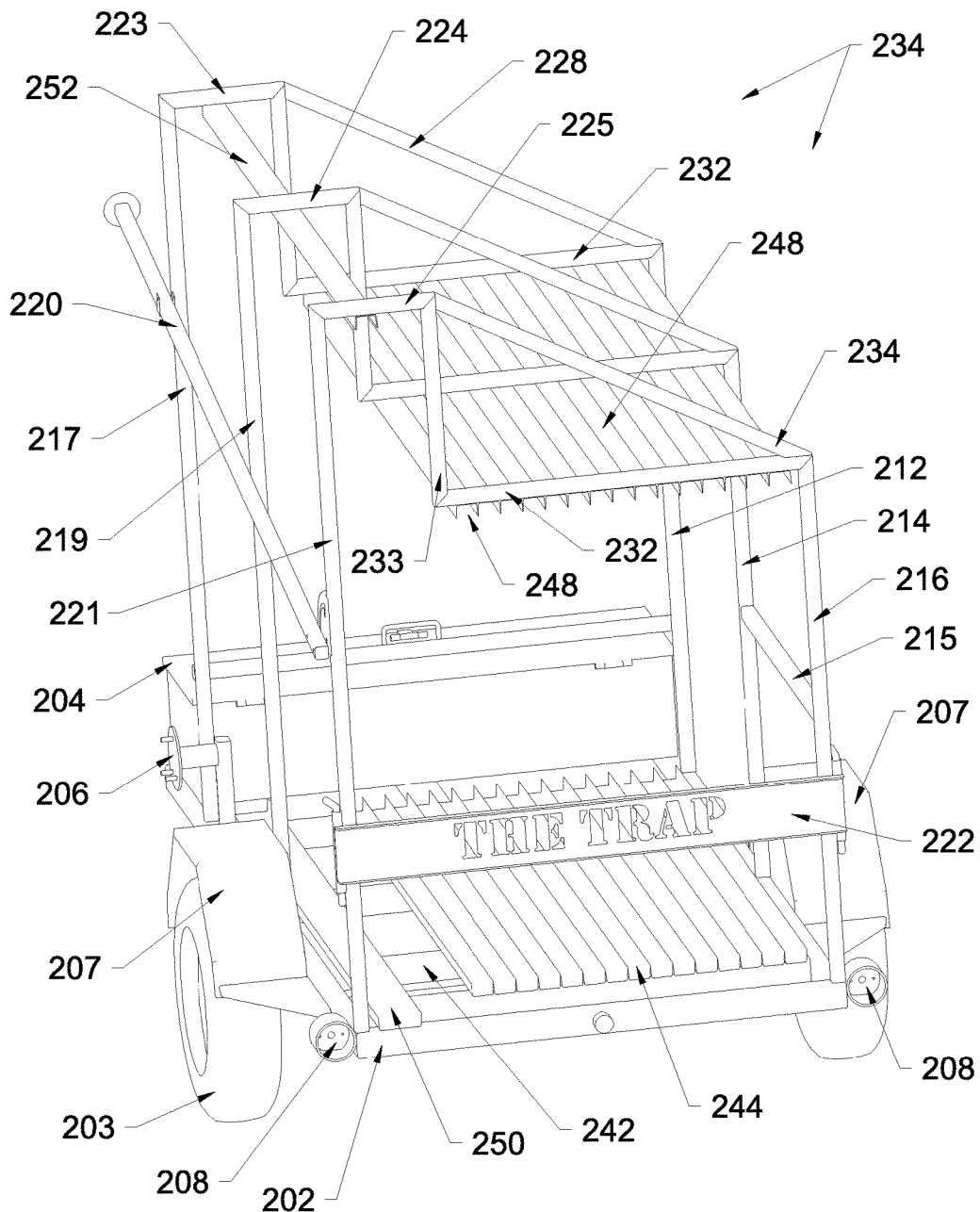
FIG. 11 is a fragmentary rear isometric view of the trailer of FIGS. 9 and 10.
Figure 12:
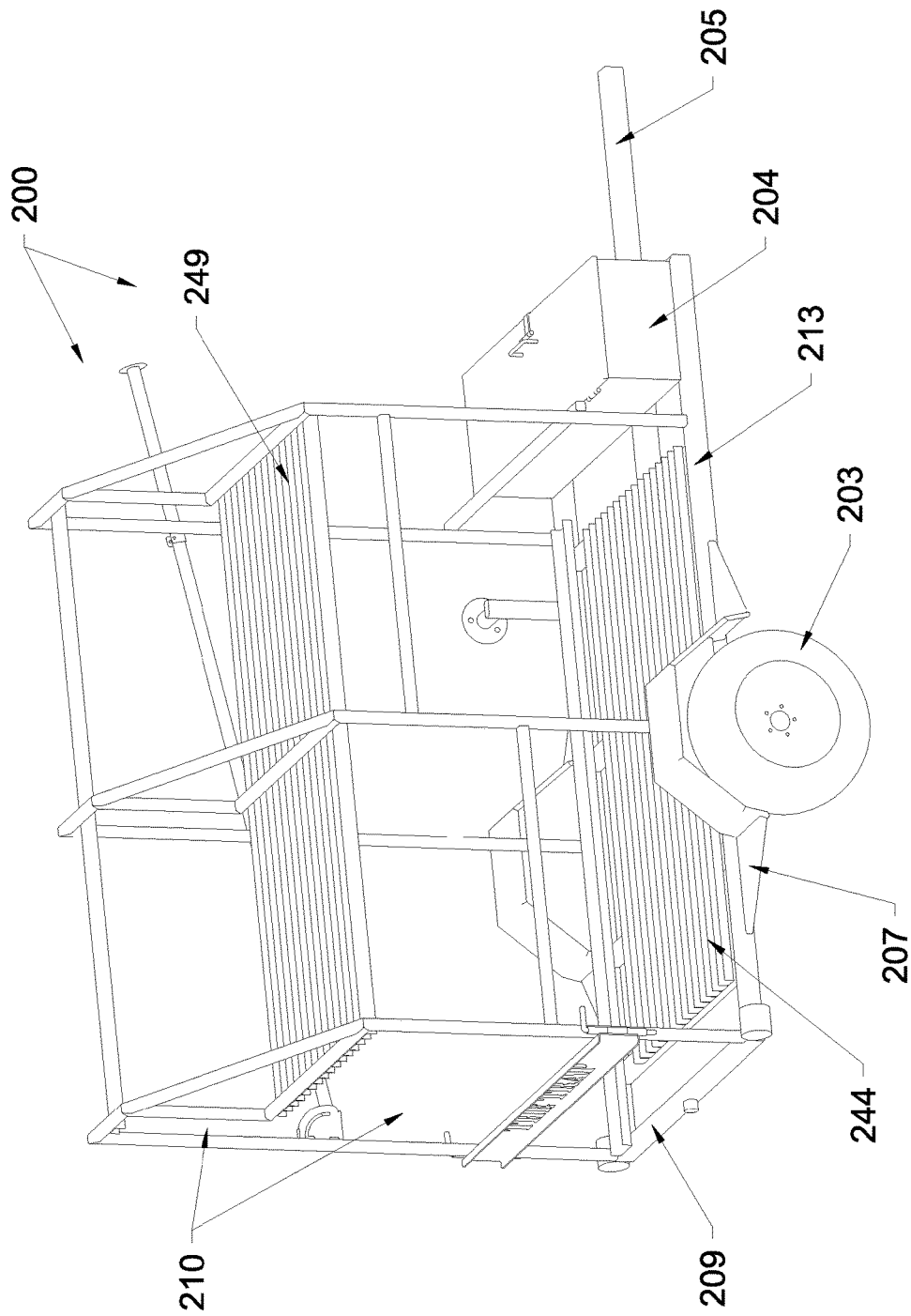
FIG. 12 is a fragmentary right side isometric view of the trailer of FIGS. 9-11.

Trailer 200 comprises a rigid, generally rectangular, frame 202 having front 201, rear 209, and sides 211 (FIG. 10) and 213 (FIG. 12). Frame 202 supports at least one wheeled axle 203 that is covered by conventional fenders 207 at each side of the trailer. A conventional trailer tongue 205 secured at the front (i.e., the towing end) enables connection to a suitable towing vehicle and trailer hitch (not shown). Preferably trailer 200 is equipped with a front-mounted storage box 204 for storing and hauling miscellaneous tools, and corral accessories such as hinge pins 45 and ground stakes 31 (i.e., FIG. 5) and related accessories and parts. Preferably there is a front-mounted spare tire carrier 206 disposed at one side of the trailer that is welded to the frame 202. Conventional tailights 208 are disposed at the trailer rear (i.e., FIGS. 9, 11).

Rising upwardly from the lower base frame 202 is a rigid, vertical confining frame structure, generally indicated by the reference numeral 210. The right side of the confining frame 210 (i.e., as viewed in FIG. 11) comprises a trio of rigid, vertically spaced apart, stanchions 212, 214, and 216 rising upwardly from frame 202. The left side includes another trio of upright, perpendicular stanchions 217, 219, and 221 that form the opposite side of the trailer 200. The left side stanchions 217, 219 and 221 are generally aligned with and parallel with the right side stanchions 212, 214, and 216 respectively, but the left side stanchions are substantially longer. Preferably there is at least one transverse reinforcement strut 218 (FIG. 9) bracing the front, and extending between side stanchions 212 and 217. A detachable rear panel 222 selectively braces the rear (FIG. 9) to close the confining frame 210 after loading the trailer. Similarly there is at least one longitudinally extending reinforcement strut 215 (FIG. 9) bracing the right side. An optional, selectively deployable antenna mount 220 is pivoted to stanchion 221 at the trailer left side and selectively latched to front stanchion 217. Suitable antennas for interfacing with the controller 68 can be secured to mount 220.

At their tops stanchions 217, 219, and 221 respectively support horizontal struts 223-225 that extend horizontally over the frame 202 towards the right (i.e., as viewed in FIG. 11) to support a trio of elevated, triangular trusses 228 to which they are welded. Trusses 228 extend horizontally across the top of the trailer and are welded at their right ends (i.e., as viewed in FIG. 11) to right side frame stanchions 212, 214, and 216. Each truss 228 comprises a horizontal base portion 232, a vertical side 233, and a diagonally positioned strut 234 (i.e., FIGS. 10, 11) forming the hypotenuse of each truss assembly.

Figure 10:
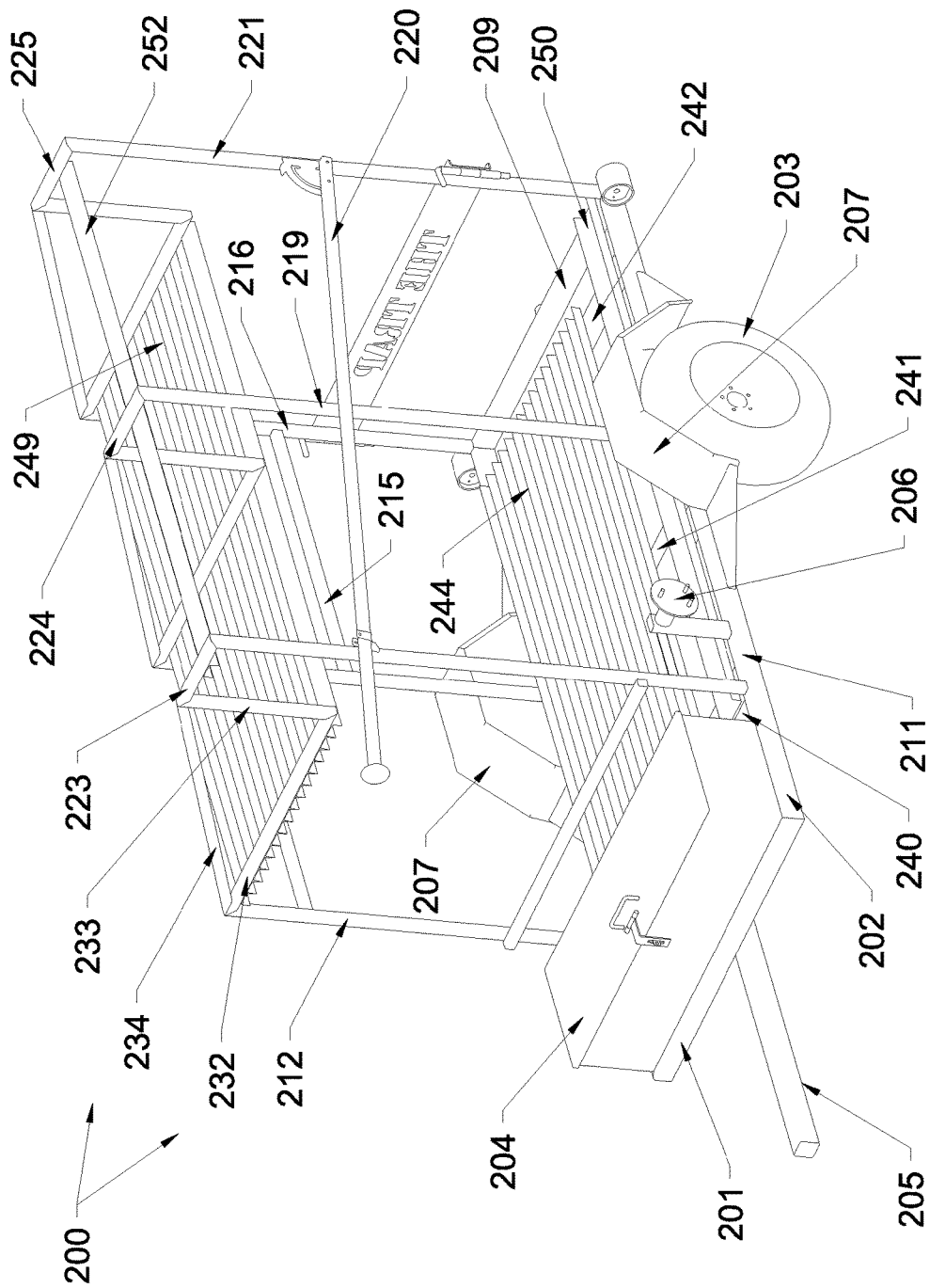
FIG. 10 is a fragmentary, frontal isometric view of the trailer of FIG. 9.
Figure 16:
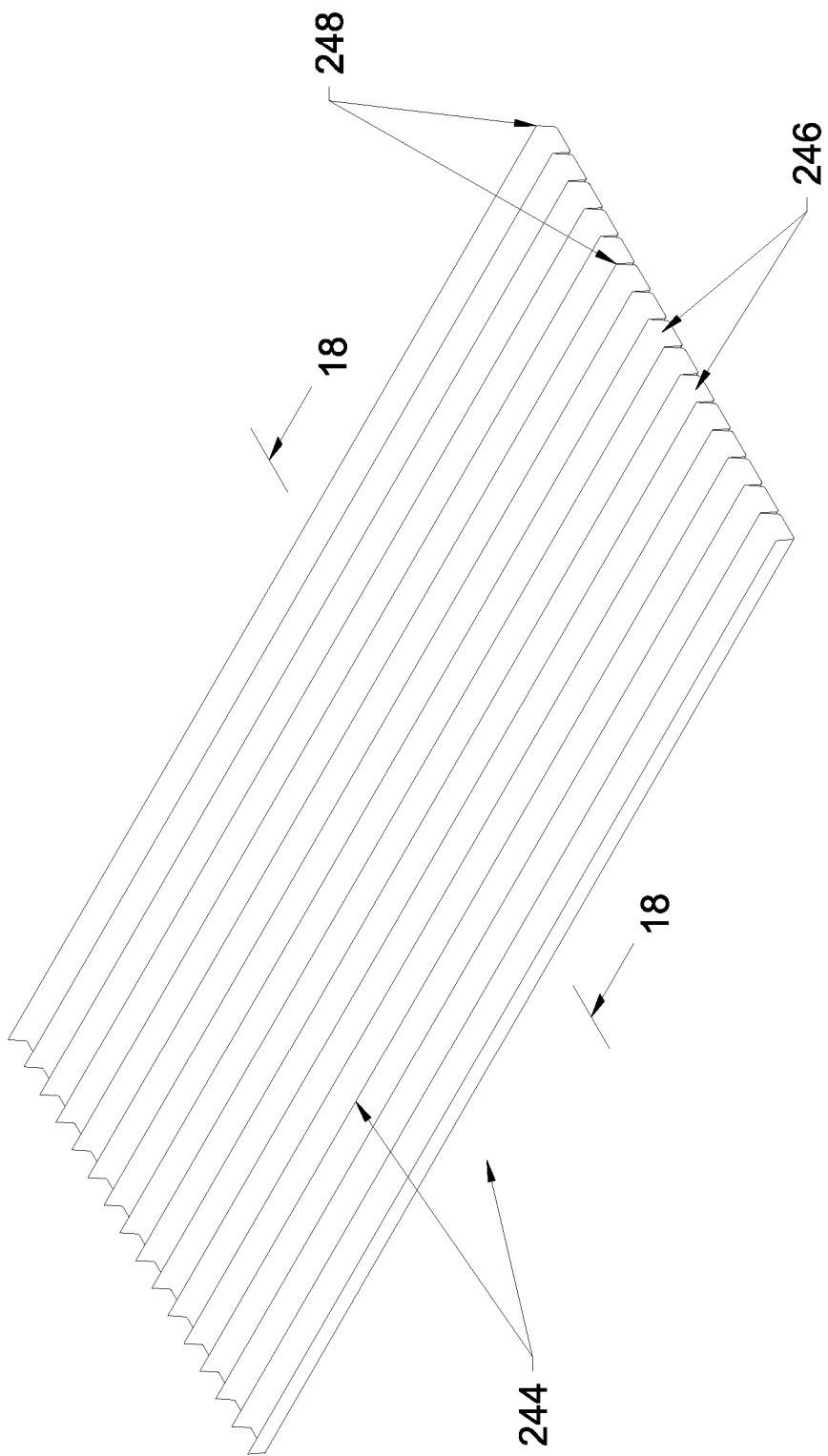
FIG. 16 an isometric view of a trailer floor or ceiling showing the channels between which fence panels are slidably fitted.
Figure 17:
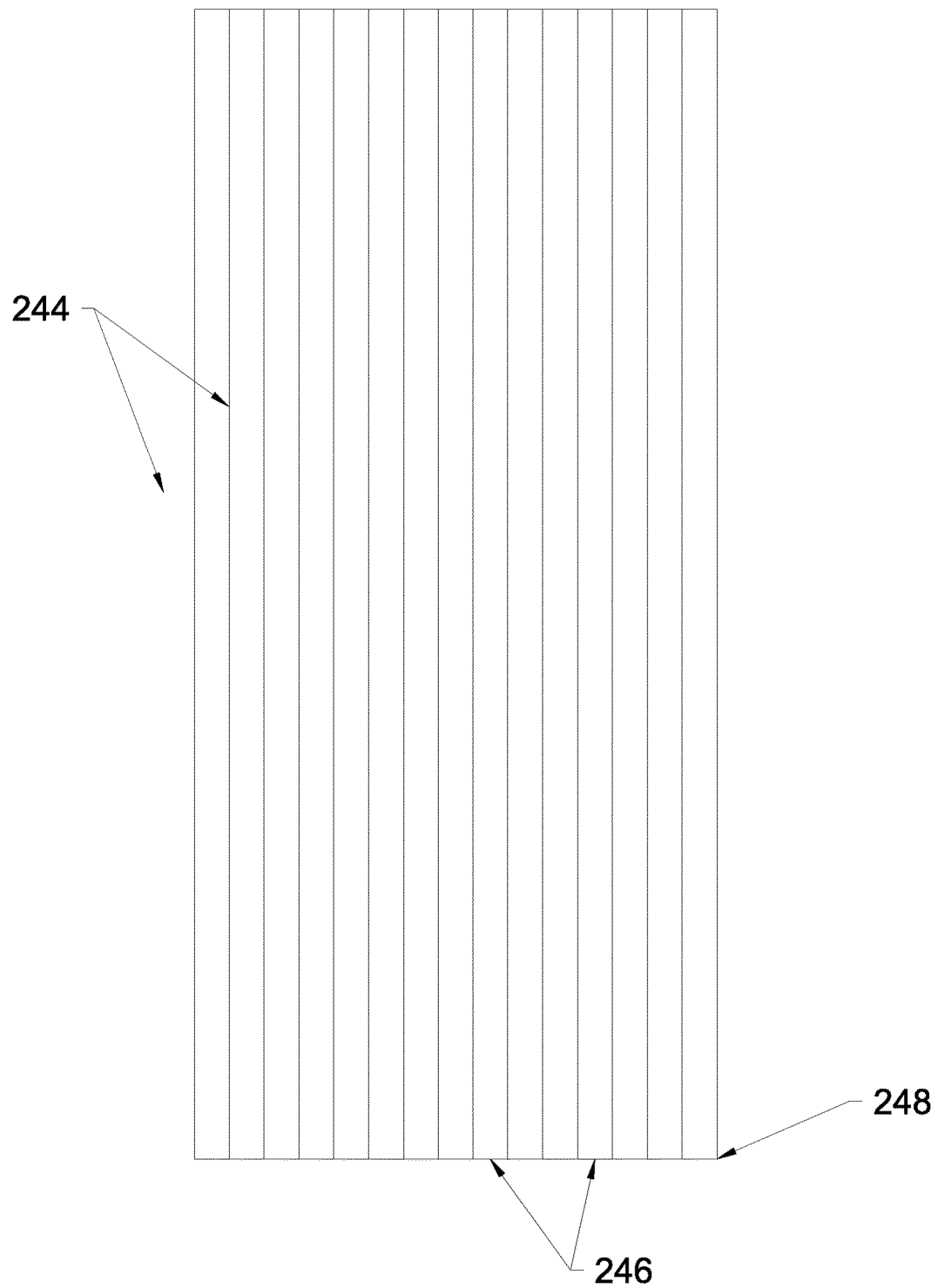
FIG. 17 is a top plan view of the typical floor or ceiling seen in FIG. 16.
Figure 18:
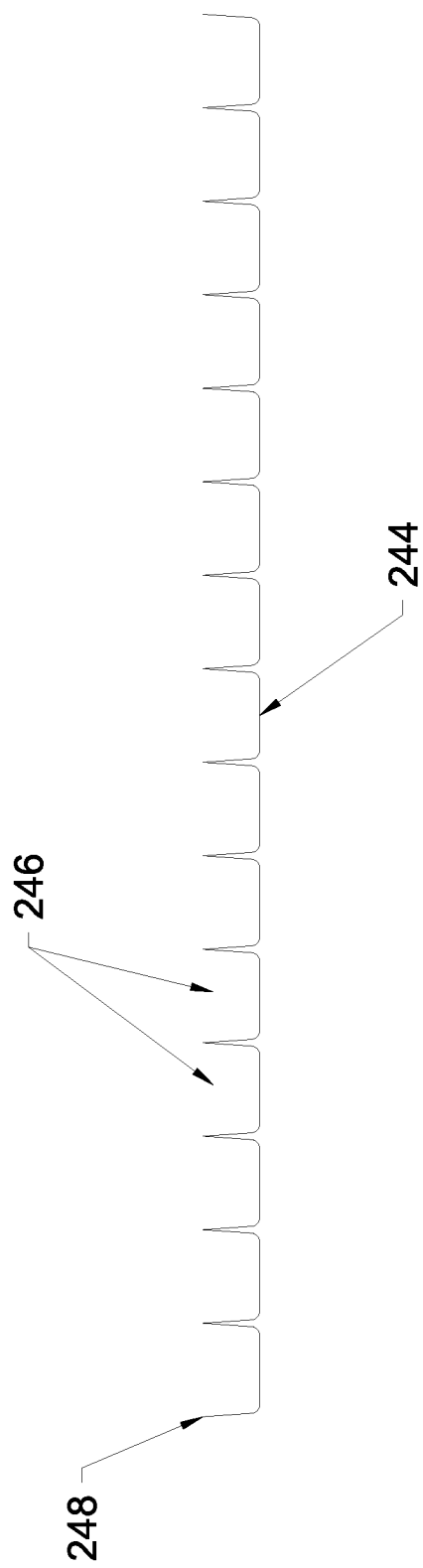
FIG. 18 is a sectional view of a floor panel taken generally along line 18-18 in FIG. 16.

As best viewed in FIGS. 10 and 11, frame 202 comprises three rigid, spaced apart, frame members 240 (FIG. 9) and 242 (FIG. 11) that transversely extend across and between the base frame sides beneath the elevated frame structure 210. Frame members 240, 242 support a generally rectangular, channeled floor 244 (i.e., FIGS. 11, 16) that supports multiple fence panels 24 when they are being transported within trailer 200. As best viewed in FIGS. 16-18, the floor 244 comprises a plurality of elongated, generally rectangular channels 246 that are separated by divider walls 248. As previously discussed, each upper truss 228 has aligned and parallel, horizontally extending base portions 232. A rigid, generally rectangular and channeled ceiling 249 is disposed upon truss portions 232, in alignment with the floor 244 below it. The ceiling 249 is identical with the floor 244, and its channels are vertically aligned with corresponding channels 246 (i.e., FIG. 18) in the floor 244.

It will be appreciated that the chosen mobile platform, whether or not a trailer, will function as intended for storing and stably transporting parts as long as an appropriate channeled floor 244 is associated with a suitable channeled ceiling 249. Thus irregardless of the chosen mobile platform type, the various fence panels 24 can be securely, vertically captivated between the floor 244 and the ceiling 249, with their tops and bottom respectively riding within and captured between the registered channels 246 in the floor 244 and ceiling 249. However, for ease of use, simplicity, and economy, a trailer is the preferred form of mobile platform for trap system 20.

The gate assembly 26 mentioned earlier in conjunction with the above discussion of FIGS. 1 and 6-8 is preferably mounted for transport within the trailer 200 in parallel with the fence modules 24. From FIGS. 10 and 11 it will be noted that there is a rigid, elongated, channel 250 extending along the bottom left side of the trailer 200, spaced apart from and parallel with floor 244. At the top of the trailer 200 there is a similar rigid channel 252 that is inverted, and which extends between struts 223-225 vertically above channel 250 (i.e., FIGS. 11, 14). When being transported, the gate assembly 26, with trap door 28 nested therewithin, can be secured between and within channels 250, and 252 in a stable vertical orientation spaced apart from, and parallel with the similarly vertically stored fence modules 24.

The alternative trailer is designated by the reference numeral 300 (FIGS. 21-27). As before, the various parts of corral 22, including the fence elements 24, the gate apparatus 26 and other parts are all neatly and stably stowed within trailer 300. In FIGS. 21-24 trailer 300 is shown unloaded, Trailer 300 is shown loaded in FIGS. 25-27.

Figure 24:
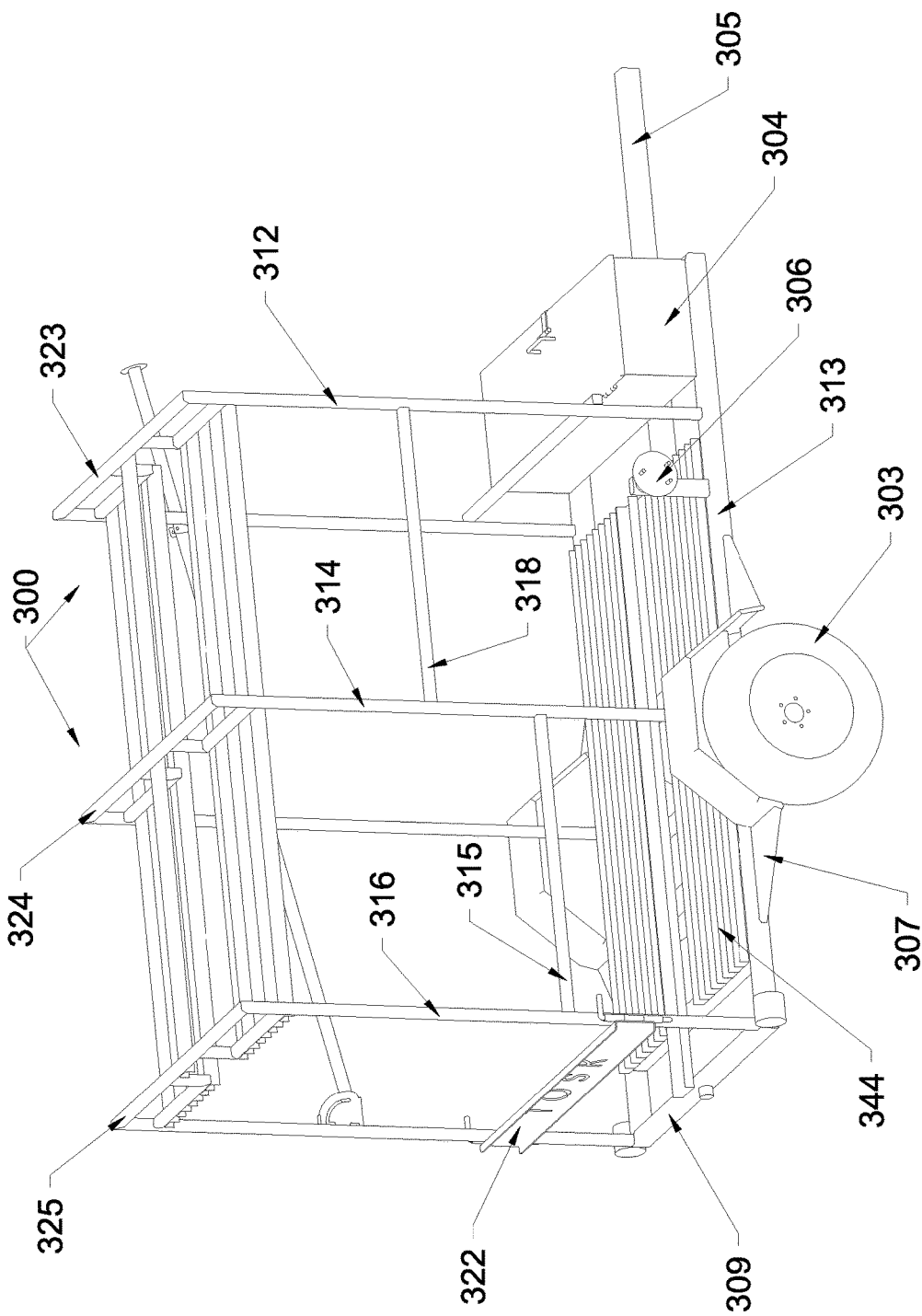
FIG. 24 is a fragmentary right side isometric view of the trailer of FIGS. 21-23.
Figure 25:
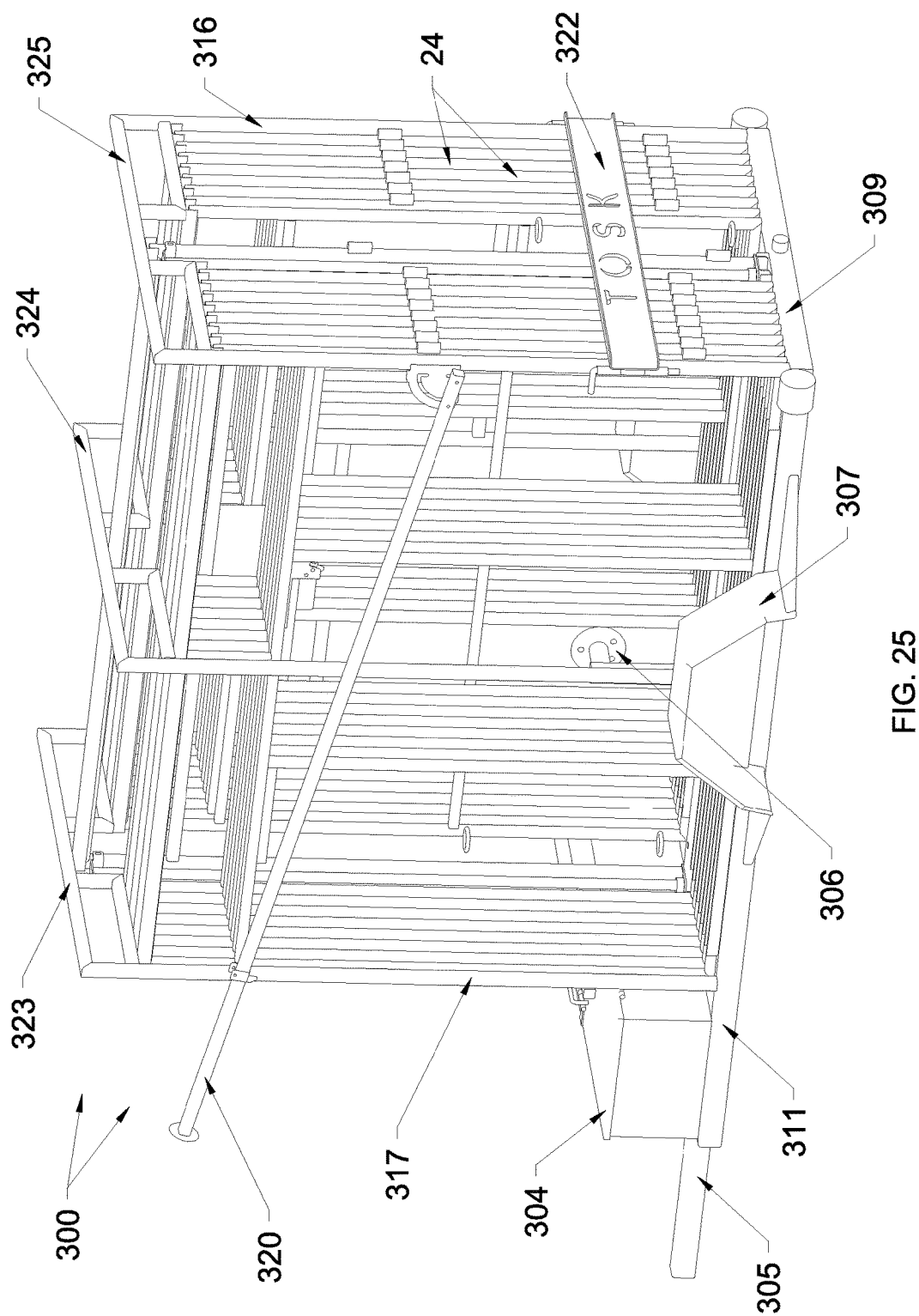
FIG. 25 is a fragmentary, isometric view of the undeployed alternative system showing the alternative trailer loaded, and illustrating placement of the gate, and various fence panels and accessories.

Alternative trailer 300 comprises a rigid, generally rectangular, frame 302 comprising a rigid, transverse front portion 301 (FIG. 21), rear portion 309 (FIG. 24), and parallel frame sides 311 (FIG. 21) and 313 (FIG. 24). Frame 302 has at least one wheeled axle 303 assembly that is shrouded by conventional fenders 307. A conventional trailer tongue 305 interconnects with a suitable towing vehicle. As before, trailer 300 has a front-mounted storage box 304, and a front-mounted spare tire carrier 306 that are welded to the frame 302. Conventional tailights 308 are welded at the trailer rear (i.e., FIGS. 9, 11).

A rigid, confining frame structure, generally indicated by the reference numeral 310 extends vertically upwardly from frame 302. The right side of the vertical frame structure 310 (i.e., as viewed in FIG. 23) comprises a trio of rigid, vertically spaced apart, stanchions 312, 314, and 316 rising upwardly from frame 302. The left side includes another trio of upright, perpendicular stanchions 317, 319, and 321 that form the opposite side of the trailer 300. The left side stanchions 317, 319 and 321 are generally aligned with and parallel with the right side stanchions 312, 314, and 316 respectively, and with trailer 300, the left side stanchions are substantially equal in length to the right side stanchions. Preferably there is a transverse reinforcement strut 318 (FIG. 24) bracing the apparatus and extending between side stanchions 312 and 317. A similar transverse reinforcement strut 315 extends between stanchions 314 and 316. A detachable rear panel 322 selectively closes the trailer and braces the trailer rear (i.e., FIG. 21) after loading. An optional, selectively deployable antenna mount 320, which is pivoted to stanchion 321 at the trailer left side and selectively latched to front stanchion 317, can support the necessary antenna for controller 68B.

Figure 23:
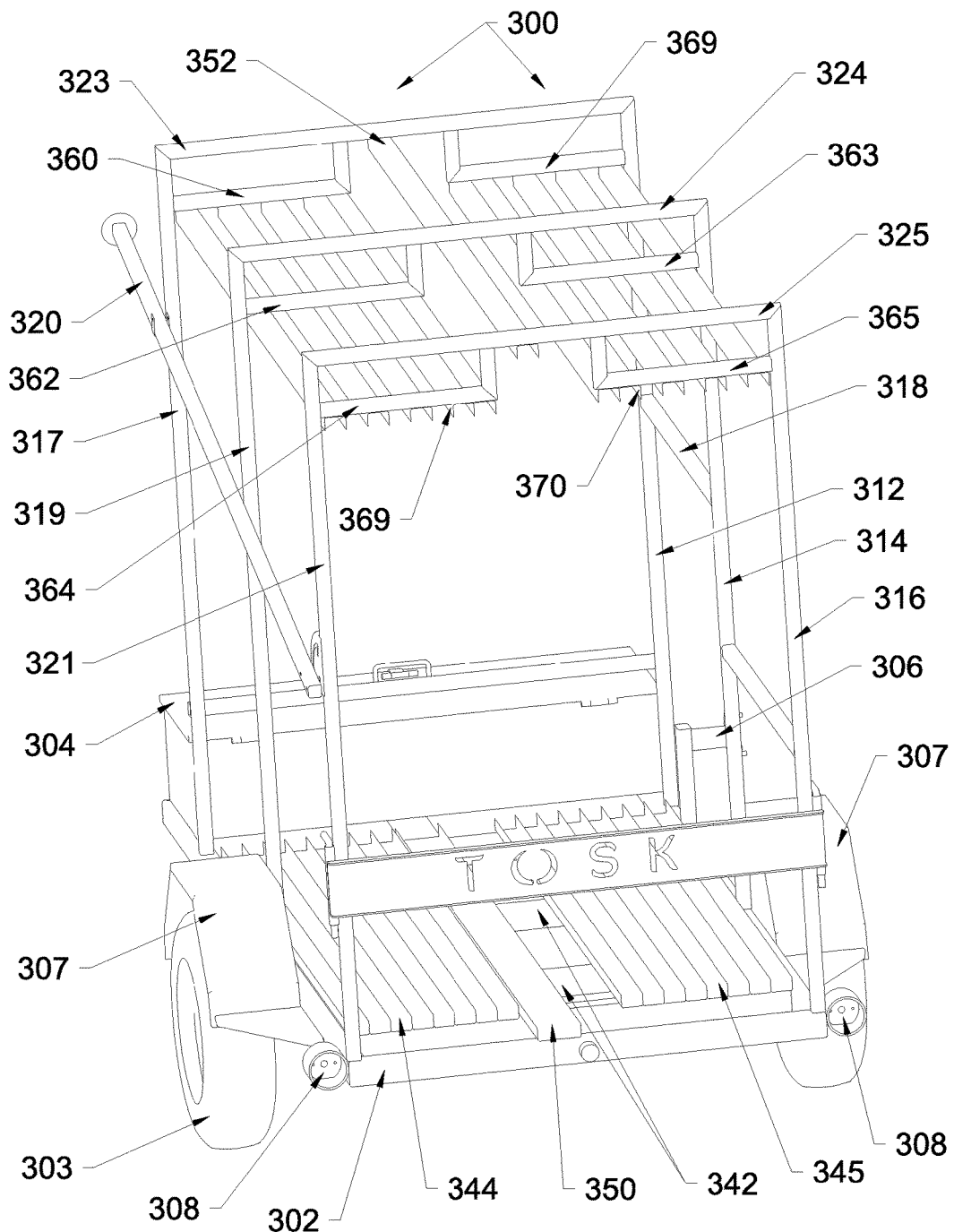
FIG. 23 is a fragmentary rear isometric view of the trailer of FIGS. 21 and 22 showing the modified roof structure.

At the trailer top the vertical confining frame structure 310 has uppermost horizontal struts 323, 324, and 325 extending respectively between stanchions 317, 319, and 321 and stanchions 312, 314, and 316. Each horizontal upper strut 323, 324 and 325 has a corresponding pair of smaller, parallel struts disposed beneath it. For example, strut 323 has smaller struts 360 and 361 beneath it (i.e., FIGS. 22, 27). Strut 324 has smaller struts 362 and 363 beneath it (FIG. 23.) Strut 325 has smaller axially aligned struts 364 and 365 parallel with it and beneath it.

As best viewed in FIG. 23, frame 302 comprises a plurality of horizontal, spaced apart frame members 340 (FIG. 21) and 342 (FIG. 23) that transversely extend across and between the sides 311 and 313 of frame 302 beneath the elevated frame structure 310. Transverse frame members 340, 342 support generally rectangular, channeled floors 344 and 345 (i.e., FIGS. 21, 23) that are horizontally oriented. The upper struts 360-365 discussed above support channeled ceilings 369 and 370 (FIG. 23), that are horizontally oriented and spaced apart from and parallel with the lower floors 344, 345. Floors 344, 345 and ceilings 369, 370 are constructed similarly to those seen in FIGS. 16-18, which were discussed in detail in the corresponding text above. The various elongated channels in opposed ceilings and floors are aligned to receive and support the fence panels 24 for transportation. Upper and lower portions of the panels are slidably captivated within aligned channels (i.e., channel 246 in FIG. 18), and the panels 24 are thus transported in a stable, semi-permanent vertical orientation.

Figure 26:
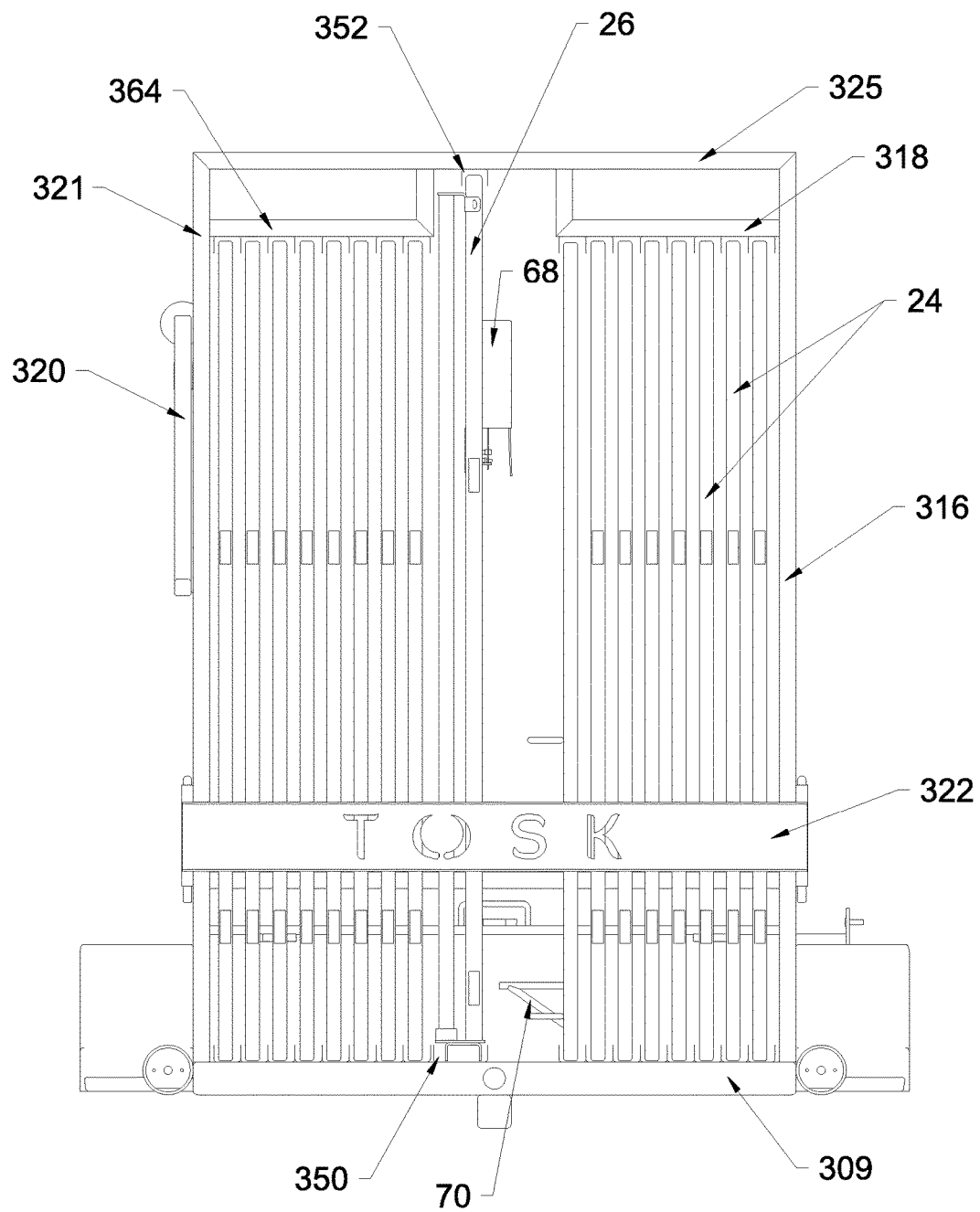
FIG. 26 is a fragmentary, rear plan view of the undeployed alternative system showing the alternative trailer loaded.
Figure 27:
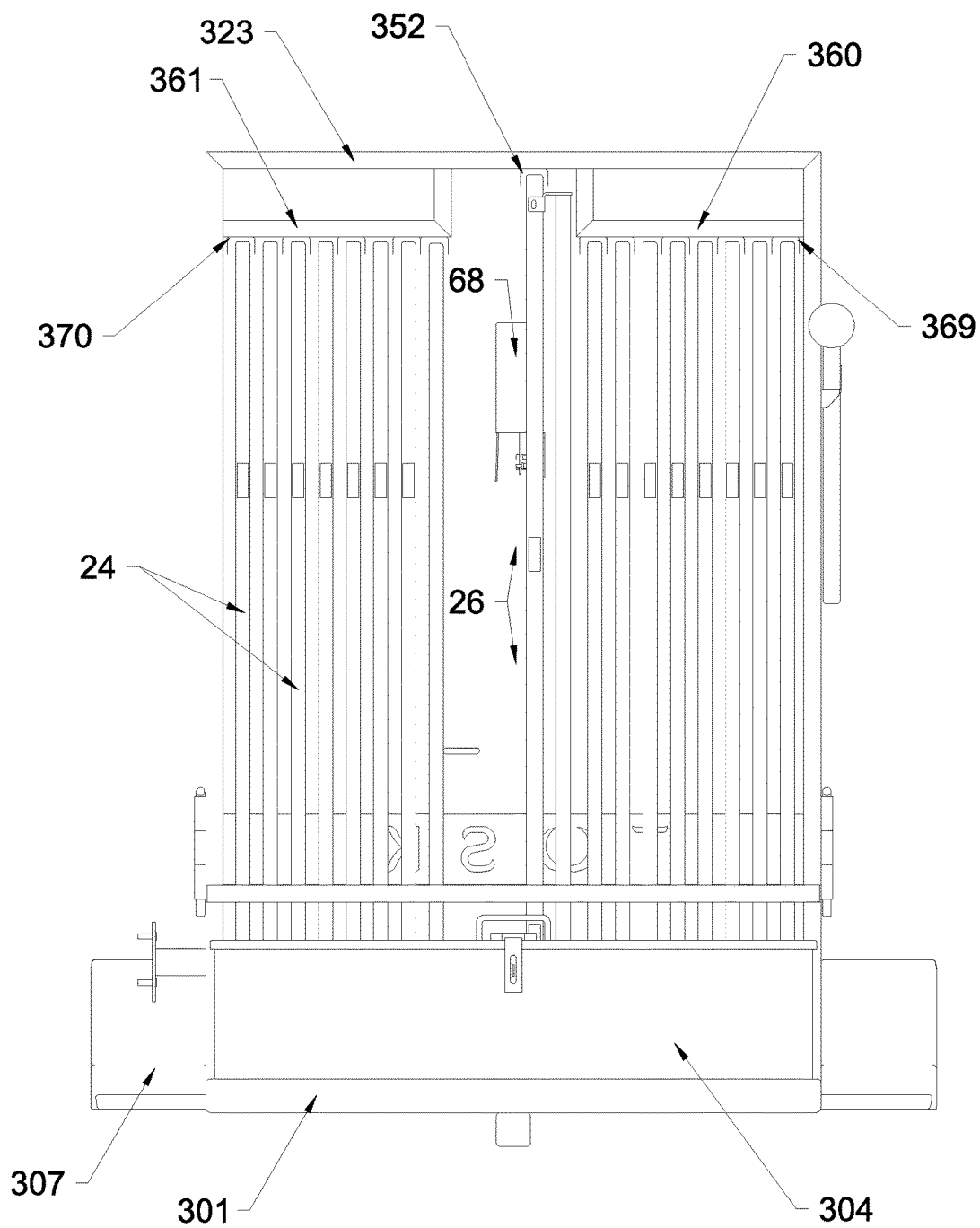
FIG. 27 is a fragmentary, front plan view of the undeployed alternative system, taken generally from a position to the left of FIG. 13, again showing the alternative trailer loaded.

The gate assembly 26 discussed earlier (i.e. FIGS. 1, 6-8) is also vertically stored within trailer 300 for transportation (i.e., FIGS. 26, 27). For safe and stable stowage, the gate assembly is preferably disposed in parallel with the fence modules 24. A rigid, elongated, channel 350 extends along the bottom of the trailer 300, spaced apart from and parallel with floors 344 (FIG. 26). A similar rigid channel 352 is disposed at the trailer top parallel with the ceilings 369, 370 (FIG. 27). When being transported, the gate assembly 26, with trap door 28 nested therewithin, can be secured between and within channels 350 and 352 in a stable vertical orientation spaced apart from, and parallel with the similarly vertically stored fence modules 24.

FIG. 14 illustrates the gate secured within the trailer between its channels 250, 252. The various fencing panels 24 are similarly stored in the trailer in parallel fashion with them slidably disposed within and between opposite, aligned channels in the ceiling and floor discussed above.

Figure 28:
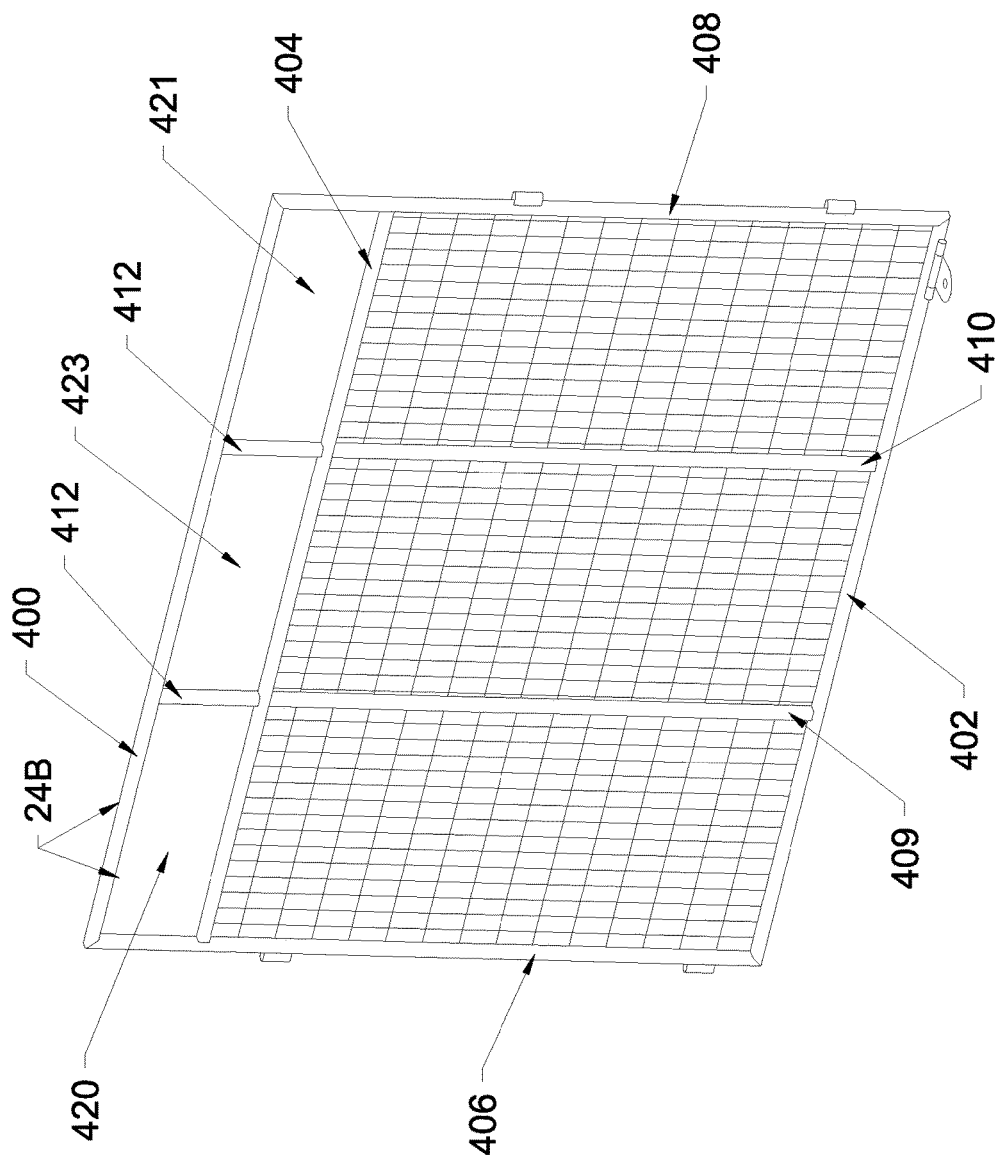
FIG. 28 is an enlarged, isometric view showing a preferred anti-climbing fence panel used with the alternative trap system.
Figure 29:
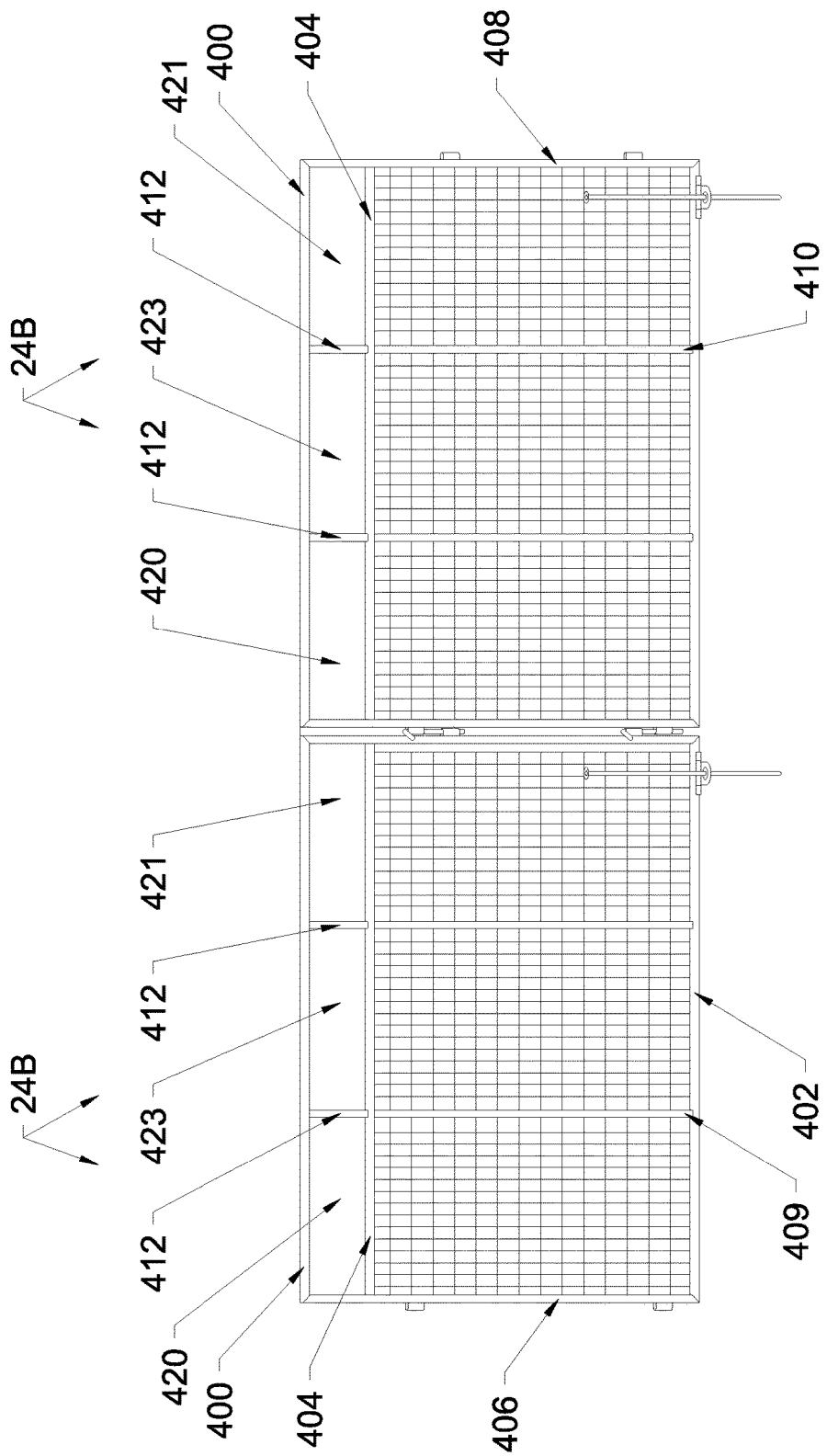
FIG. 29 is an enlarged, fragmentary isometric view illustrating assembled, adjacent anti-climbing fence panels; and, FIG. 30 is an isometric view of a preferred anti-climbing gate with an anti-climbing trap door.

Referencing FIGS. 28-29, a preferred fence panel 24B has been designed and modified to prevent hogs from climbing to escape capture. Fence panels 24B are substantially similar to fence panels 24 described in detail earlier, and corral 22 described previously (FIG. 1) can comprise combinations of fence panels 24 and/or 24B.

The anti-climbing fence panels 24B comprise an elongated, rigid top horizontal rail 400, a parallel, spaced apart horizontal bottom rail 402, and an intermediate horizontal rail 404. Vertical side rails 406 and 408 brace the fence panel sides, extending from bottom 402 to rails 400 and 404. Reinforcement is provided by intermediate vertical rails 409, 410 extending between horizontal rails 402, 404. Further reinforcement is provided by a pair of smaller vertical rails 412 extending from intermediate horizontal rail 404 to top rail 400 (FIG. 28). As seen in FIG. 29, adjacent panels 24B can be coupled together in the same manner panels 24 are pinned together, as described previously.

Fence panels 24B, which may be from four to six feet tall, are adapted to prevent climbing by captured feral hogs. Importantly, there is an approximately ten to twelve inch gap 420 or 421 or 423 (FIG. 28) between top rail 400 and intermediate rail 404. Preferably the distance been upper rail 400 and intermediate rail 404 is between ten to twenty five percent of the distance between bottom rail 402 and top rail 400. Gaps 420, 421 and 423 are preferably separated by the optional vertical reinforcement rails 412. The gaps 420, 421, 423 comprise anti-climbing voids at the top of each fence panel 24B. It has been found that these anti-climbing voids make it virtually impossible for feral hogs 21 to climb over the panels and escape the corral. Fence panels 24 discussed earlier (i.e., FIG. 1), lack these gaps, and are recommended for use with animals that tend to stick their necks through gaps like voids 420, 421 (FIG. 28).

The anti-climbing gate 26B is quite similar to rigid gate 26 previously described. It controls an anti-climbing trap door 28B that is similar to trap door 28 discussed earlier. The controller 68B can be activated, in the manner previously described, to drop the trap door 28B into the closed position illustrated in FIG. 30. The anti-climbing trap door 28B is provided with a pair of ten to twelve inch high, spaced apart gaps 429, 430 between post 431. Gaps 429, 430 function as anti-climbing voids that make it difficult for a feral hog to climb over the deployed gate 28B and escape. These gaps 429, 430 function similarly to the gaps 421, 420 in the anti-climbing fence panels 24B described earlier.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable modular corral adapted to be transported to and assembled at a trapping site for capturing and restraining animals, the corral comprising:
   a plurality of generally rectangular fence panels that form a corral periphery;
   each fence panel comprising means for removably, pivotally coupling the panel to adjacent panels when the corral is deployed and anti-climbing voids for preventing animals from climbing, wherein said fence panels comprise a rigid top rail, a parallel, spaced apart bottom rail, and an intermediate horizontal rail disposed between said top and bottom rails, with voids formed between said top and intermediate rails for preventing animals from climbing;
   at least one gate adapted to be coupled between fence panels that establishes a corral entryway, the gate supporting a trap door disposed over an entryway threshold that, when open, allows animal access into said corral and which, when closed, prevents animal escape from said corral, the gate comprising a pair of spaced-apart sides between which the trap door is slidably captivated, wherein the gate is generally rectangular;
   wherein the gate comprises a frame with slide tubes for slidably captivating the trap door, the trap door comprising slide rings slidably captivated on said slide tubes; and,
   a trigger for releasing the trap door to enclose the corral and capture animals confined therewithin.

2. The corral as defined in claim 1 further comprising a plurality of stakes that can be driven into the ground during corral erection to secure the corral to the ground, and wherein each fence panel comprises a hinged stake tab through which a stake may be driven to secure the deployed corral, the tab adapted to be disposed generally perpendicularly to said fence panel when the corral is staked to the ground and generally vertically when the fence panels are stowed;

wherein said adjacent fence panels are coupled together with spaced apart sleeves on said fence panels and pins for coupling aligned sleeves on adjoining panels together.

3. The corral as defined in claim 1 wherein said trigger means comprises a remotely actuable controller responsive to cell phone instructions for triggering the trap.

4. A portable modular corral adapted to be transported to and assembled at a trapping site for capturing and restraining animals, the corral comprising:

a plurality of generally rectangular fence panels that form a corral periphery;

each fence panel comprising means for removably, pivotally coupling the panel to adjacent panels when the corral is deployed and anti-climbing voids for preventing animals from climbing, wherein said fence panels comprise a rigid top rail, a parallel, spaced apart bottom rail, and an intermediate horizontal rail disposed between said top and bottom rails, with voids formed between said top and intermediate rails for preventing animals from climbing;

at least one gate adapted to be coupled between fence panels that establishes a corral entryway, the gate supporting a trap door disposed over an entryway threshold that, when open, allows animal access into said corral and which, when closed, prevents animal escape from said corral, the gate comprising a pair of spaced-apart sides between which the trap door is slidably captivated;

a trigger for releasing the trap door to enclose the corral and capture animals confined therewithin; and, wherein the gate comprises a jagged, bottom gate edge for engaging the ground as the gate is manually moved back and forth like a saw during corral erection for concealing the bottom of the gate so that gate structure cannot be seen by animals.

\* \* \* \* \*